United States Patent [19]

Hamada et al.

[11] Patent Number: 5,584,167

[45] Date of Patent: Dec. 17, 1996

[54] WORKING VEHICLE

[75] Inventors: Kenji Hamada; Toshinori Kirihata; Masami Nakamura; Youzaburo Narahara; Keita Kamikubo, all of Osaka; Mikio Takagi; Koichi Kawasaki, both of Okayama, all of Japan

[73] Assignee: Yanmar Agricultural Equipment Co., Ltd., Japan

[21] Appl. No.: 299,621

[22] Filed: Sep. 2, 1994

[30] Foreign Application Priority Data

Sep. 3, 1993 [JP] Japan .................. 5-243968
Sep. 9, 1993 [JP] Japan .................. 5-224810
Dec. 8, 1993 [JP] Japan .................. 5-340899

[51] Int. Cl.$^6$ .................. A01D 41/12; A01F 12/58; B62D 11/04

[52] U.S. Cl. .................. 56/11.4; 56/14.6; 180/6.48; 460/150

[58] Field of Search .................. 56/14.6, 10.8, 56/11.1, 11.2, 11.4, 11.7; 460/1, 150; 180/6.48, 333, 900, 9.21, 9.44

[56] References Cited

U.S. PATENT DOCUMENTS

| | | | |
|---|---|---|---|
| 3,625,302 | 12/1971 | Lauck | 180/6.48 |
| 3,727,402 | 4/1973 | Keith et al. | 180/6.48 X |
| 4,085,812 | 4/1978 | Robinson et al. | 180/6.48 |
| 4,354,420 | 10/1982 | Bianchetta | 91/6 |

Primary Examiner—Terry Lee Melius
Attorney, Agent, or Firm—Harold Gell

[57] ABSTRACT

A tracked agricultural combine vehicle for harvesting, hulling and sorting grain includes integrated control means for left and right side propulsion track assemblies wherein individual track steering commands in the form of differential track speed control are derived from a common steering wheel input and vehicle speed is controlled by a single input means which controls the speed of both tracks.

6 Claims, 22 Drawing Sheets

WORKING VEHICLE

FIELD OF THE INVENTION

This invention relates to working vehicles such as agricultural combines and the like provided with a crawler respectively on the left and the right sides, operating section, driving means with belt and a hulling machine with a grain sorting device.

BACKGROUND OF THE INVENTION

Tracked agricultural combines are a common type of working vehicle. In these prior combines, left and right crawlers or track assemblies are respectively driven by left and right hydrostatic transmission device (hereinafter abbreviated to HST) and steering is conducted by using independent left and right operating levers linked to a trunnion lever of an associated HST. This form of control causes these combines to be difficult to operate smoothly. They are poor in maneuverability because speed changing operations and turning operations have to be made by using the two levers.

Under the circumstances disclosed in Japanese patent publication No. sho 40-18576, speed changing means such as acceleration pedal and turning means such as steering wheel are respectively linked to each trunnion lever of each HST on the left and the right and forward/backward movement is made by using speed changing means and left/right turning movement is made by using turning means in order to conduct operation smoothly.

However, in the conventional art, many kinds of cams are needed to link the speed changing means and the turning means to each gear lever on both sides and accordingly many kinds of bevel gears are needed to couple various means with the cams.

OBJECTIVES AND SUMMARY OF THE INVENTION

Meanwhile, according to this invention it becomes possible to produce a working vehicle comprising: a gear shaft which is put in a gear box 28 and rotates in association with change of gear lever 35; left and right sliders 58, 59 which are designed to slide on gear shaft 33 along its axial line; left and right speed changing means 26, 27 which are linked to said left and right sliders 58, 59 and used to drive left and right crawlers 2; steering wheel 32 which is coupled to said gearbox 28 so as to freely rotate the main slider 53 which is slid by turning said steering wheel and thereby makes said sliders 58, 59 slide, characterized in that said gear shaft 33 and said left and right sliders 58, 59 are moved in one body by manipulating said gear lever 35 in order that said speed changing means 26, 27 may be switched to direct to the same direction at the same time and make said crawlers go straight forward or backward and that either one of said left and right sliders 58, 59 slid by said main slider 53 is put in such position by turning said handle 32 as to stop or move said one of said crawlers in the reverse direction to turn said working vehicle. Because of this invention, the left and the right sliders 58, 59 and the main slider 53 can be incorporated around the gear shaft 33 in a compact manner and the gear lever 35 and the steering wheel 32 can functionally be arranged around the gear shaft 33 and thereby the structure of the operating section A of FIG. 4 can be simplified and the production cost can be easily reduced.

Also in the conventional hulling machine driving systems, the tension roller clutch for applying tension to the belt with a lever to transmit the engine's driving power to the hulling section is used as the clutch of the hulling section. However, in such tension roller clutches, because the lever for switching the clutch is linked to clutch arm with wire, the operating system inevitably becomes much more complex, especially when the clutch of this type is used in a large agricultural machine such as combine. From this standpoint, it seems better to use a clutch motor in place of the aforementioned lever to switch the tension roller clutch. However, when the clutch motor is used at high speed, a large impact tends to be applied on the belt and when it is used at slow speed, maneuverability tends to be poor.

On the contrary, the combine of this invention is comprised of an engine 16 mounted on the machine floor, a belt for transmitting the driving force of said engine to the working section and a tension roller clutch 145 provided approximately in the middle point of the belt. A clutch motor 150 and control means for said tension roller clutch 145 makes the action of said tension roller clutch 145 caused by the input of said clutch motor 150 fast before said tension roller clutch touches said belt and makes said action gradually slow after said tension roller clutch touches said belt. By this device, maneuverability is improved and tension suddenly applied on the belt by sudden switching-on of the clutch motor can be avoided and thereby incidents of its breaking can be minimized to prolong the life of the belt.

Also, as disclosed in Japanese utility model application laid-open publication No. hei 3-108332, in the hulling section, the front grain sorting plate and the rear grain sorting plate are conventionally put one on the other in order that grains may fall through both plates. Therefore, their total thickness is great. Moreover, the difference in each of their weight tends to be great, whereby the difference in momentum between them also tends to be great. For this reason, the structure of vibration control equipment and their driving means can hardly be simplified.

However, the combine according to this invention, in which hulling machine 4, provided with cylinder 5 and grain sorter 7, is mounted on the vehicle floor and thereby substantially forms a combine characterized in that said grain sorter 7 is provided with front grain sorting plate 169 and rear grain sorting plate 170 which allow grains to fall for screening and said rear grain sorting plate 170 is provided with first grain flowing plate 179 to take out screened grains. Therefore, the total length of the two sorting plates can be reduced; the difference in each of their weight can also be reduced and so the difference in momentum between their swinging movement can be reduced. On this account, the structure of vibration control equipment and their driving means can be simplified.

BRIEF DESCRIPTION OF THE DRAWINGS

Other features and advantages of this invention will be apparent from the following description taken in connection with the accompanying drawing wherein:

FIG. 19 is an illustration showing the whole engine driving system.

DETAILED DESCRIPTION OF THE PREFERRED EMBODIMENT

Figure 1:
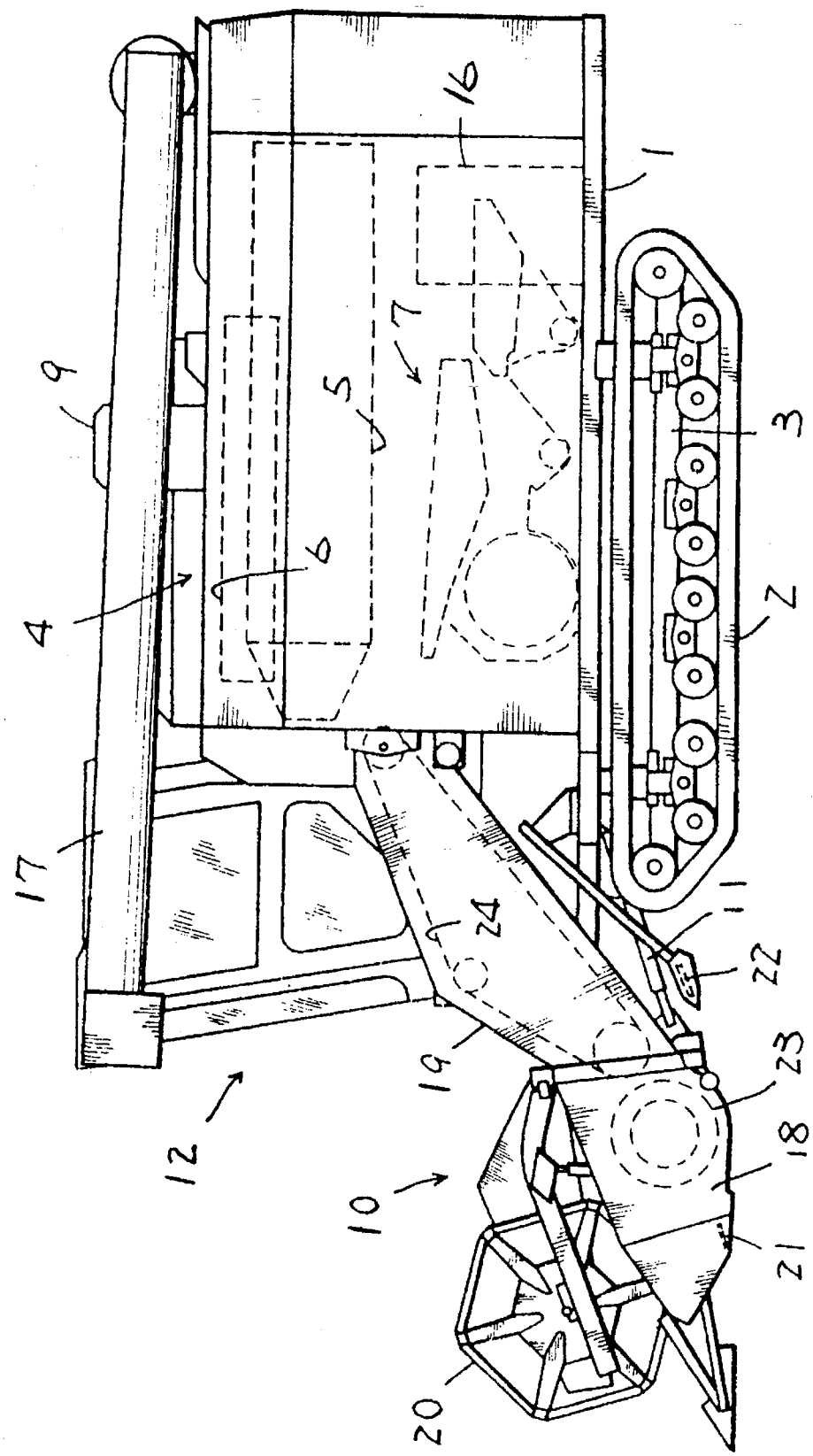
FIG. 1 is a side view of the combine.
Figure 2:
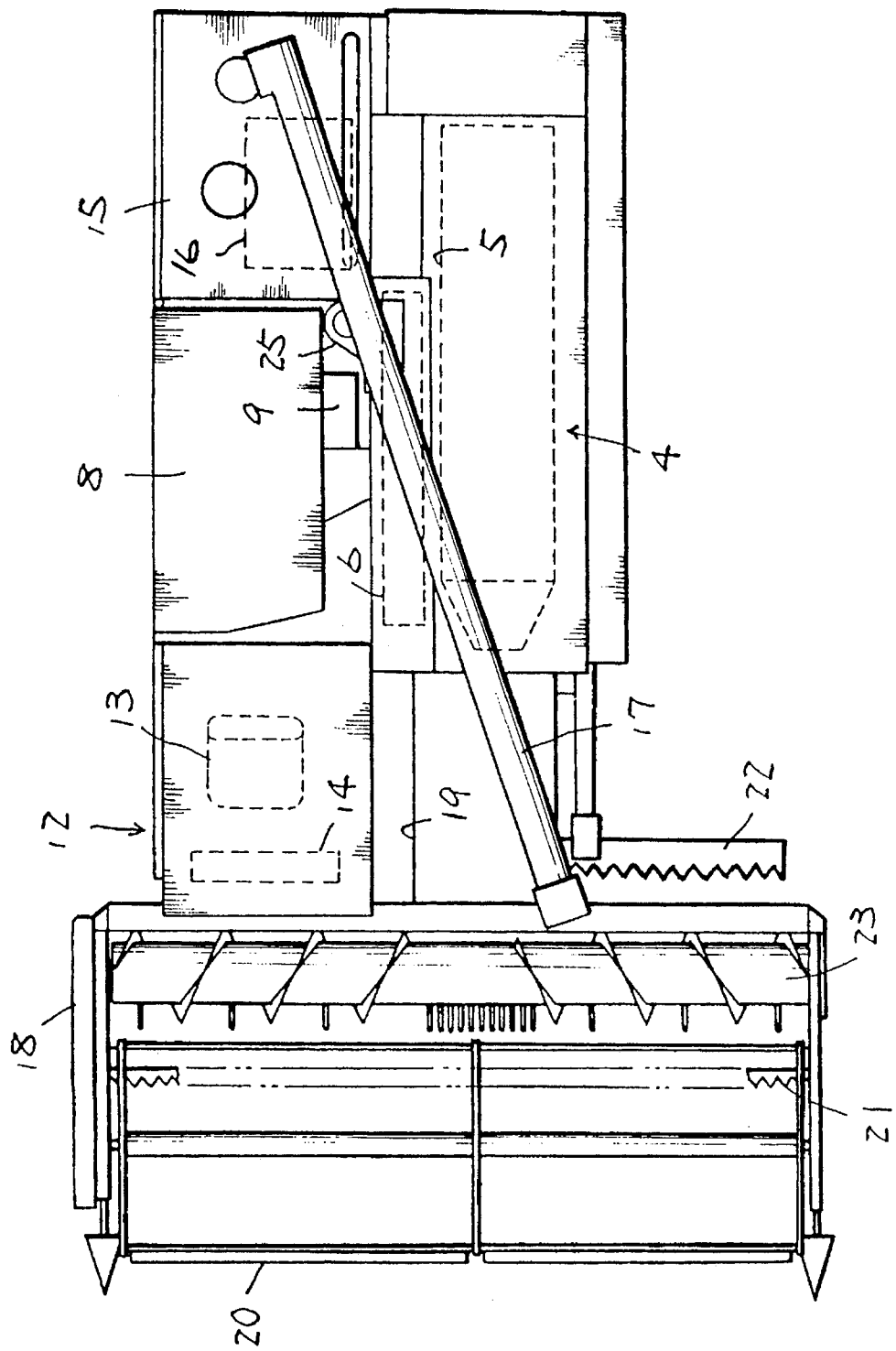
FIG. 2 is a plan of the combine.

This invention will be described in more detail according to the attached drawings. In FIGS. 1 and 2, vehicle floor 1 is mounted on frame 3 which supports two crawlers or propulsion tracks 2, one on the left and one on the right side of the agricultural combine. A hulling machine 4 provided with a screw type transport cylinder 5, a treating drum 6 and a grain sorter 7 is mounted on the vehicle floor 1. Grain tank 8 is designed to hold grains taken out from the hulling machine 4 by way of grain lifting pipe 9. Reaper 10 is designed to move up and down by means of hydraulic pressure cylinder 11 located below in front of the hulling machine 4. The operators' cabin 12 is provided with seat 13 and an operation panel 14 is located before the grain tank 8. Engine cover 15 enclosing engine 16 is located behind the grain tank 8. Auger 17 is for taking out grains from the grain tank 8.

The reaper 10 is provided with a couple of headers 18 to push their front end into yet unreaped plants and feeder house 19 is located behind the middle of the two headers to feed reaped plants to the hulling machine 4. Provided between the headers 18 are reel 20 for taking in unreaped plants, first blade 21 and second blade 22, each capable of alternating motion and auger 23 for taking in reaped plants. Reaped plants taken from the headers 18 are carried to the hulling machine 4 by means of chain conveyer 24 inside the feeder house 19.

Provided on the right side of the hulling machine is a second return pipe 25 to get yet unhulled grains back to the hulling machine 4 through the treating drum 6 in order to get them rehulled and resorted.

Figure 3:
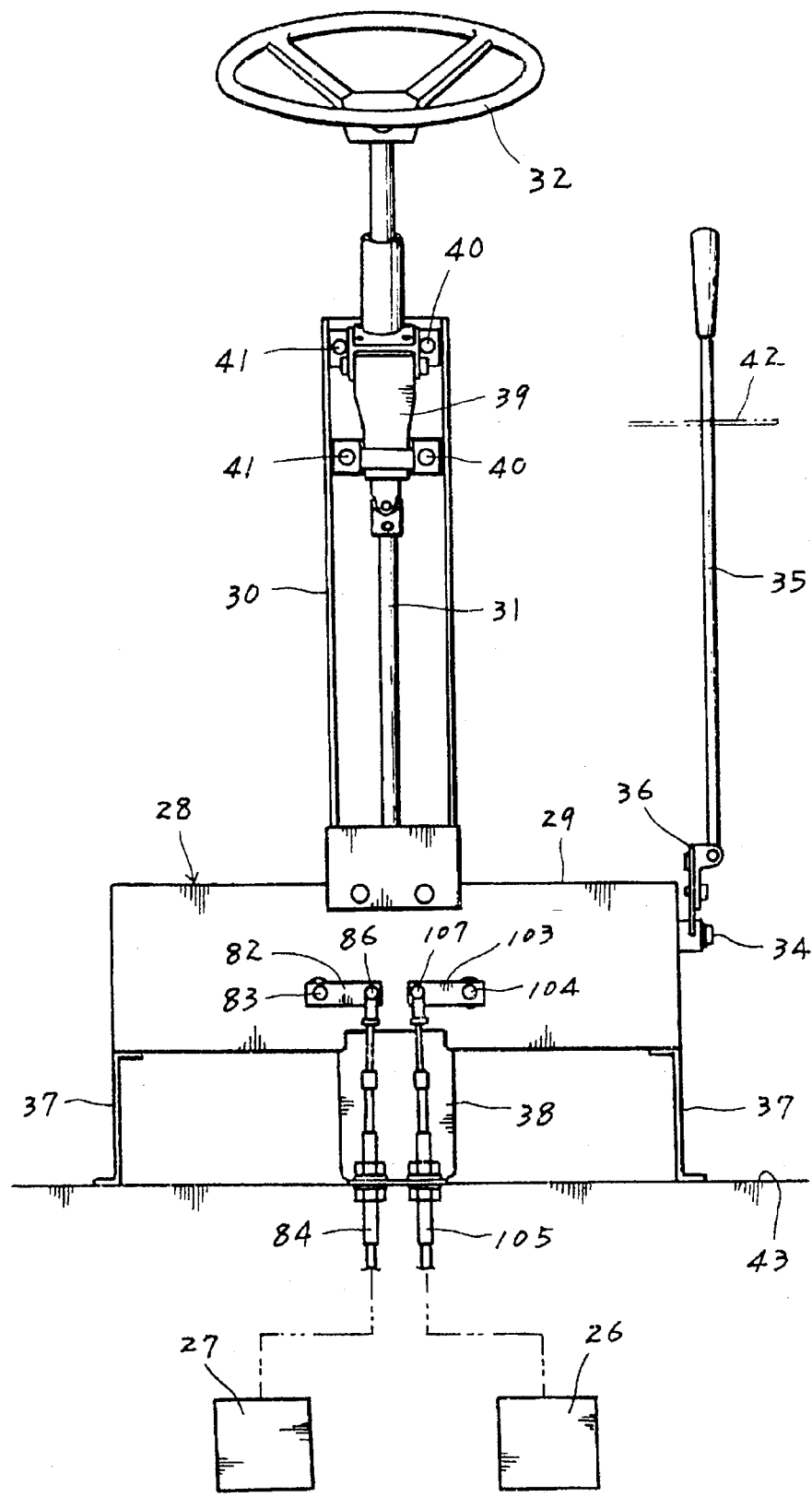
FIG. 3 is a rear view of operating section of the combine.

FIG. 3 is an outline of the operating system relating to this invention. The operating system controls the position of right tilting plate 26 and left tilting plate 27 which respectively controls an hydraulic pressure motor provided on each HST 120 that drives the crawlers 2 on both sides of the combine, whereby the combine can be moved forward and backward or turned to the right or the left, gently or sharply according to the circumstances.

Figure 4:
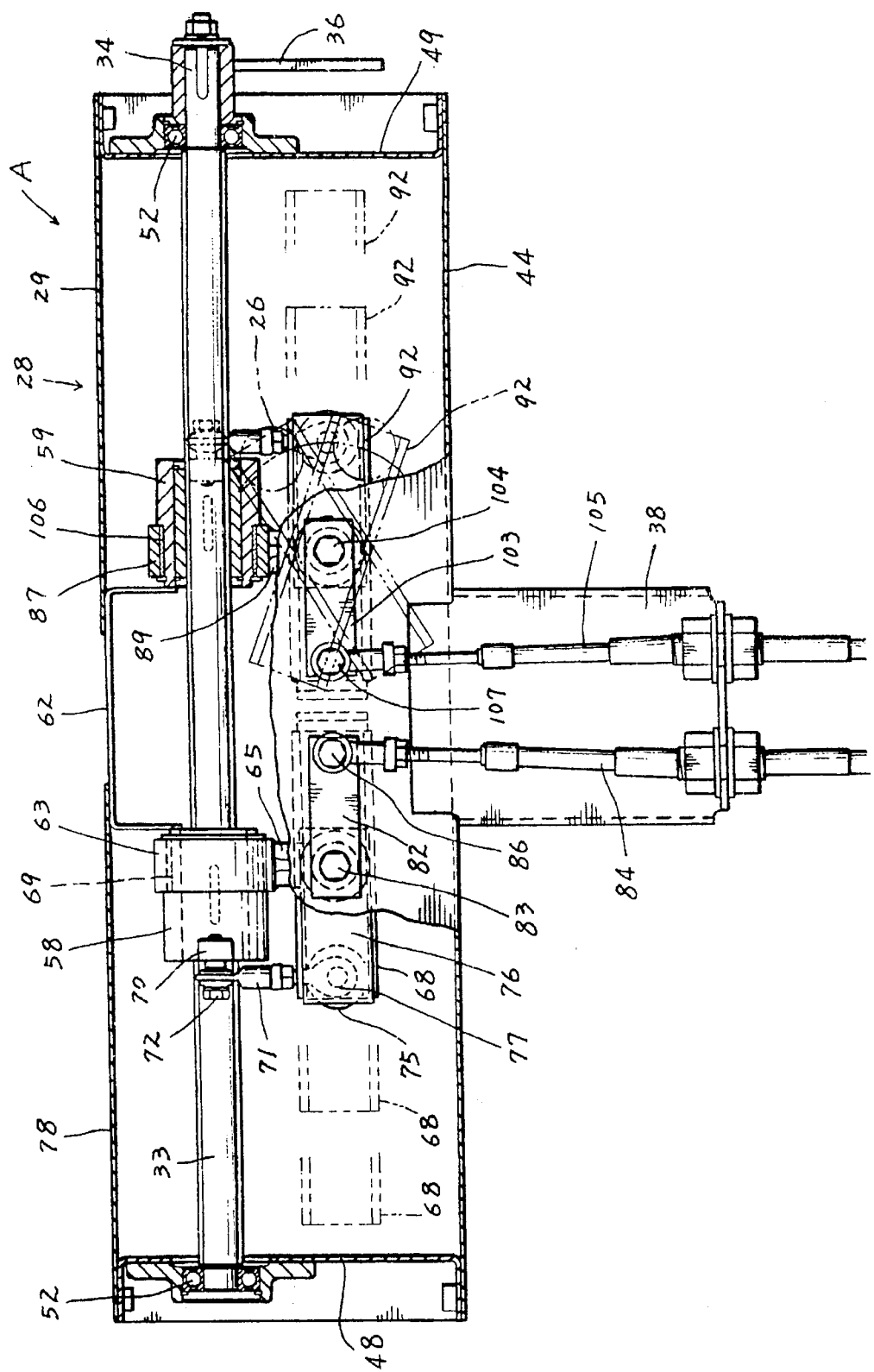
FIG. 4 is a partially cutaway rear view of the operating section.

As shown in FIGS. 3 and 4, in the operating system an operating gear is enclosed in gearbox 28 of which the shape is long in the lateral direction of the combine. In the middle part of top plate 29 of the gearbox 28, a hollow column 30 to house a steering wheel shaft 31 is erected. Provided to on top of the steering wheel shaft 31 is a round steering wheel 32. A main gear shaft 33 is put horizontally in the gearbox 28. To the right outside end 34 of the gear shaft 33, the lower end of gear lever 35 (power transmission control) is fixed by means of lever stay 36. In the figures, 37 denotes foot, 38 denotes wire stay, 39 denotes gear case, 40 denotes brackets for the holding gear case, 41 denotes securing bolts for the gear case, 42 denotes lever guide for the gear lever and 43 denotes the floor.

Figure 5:
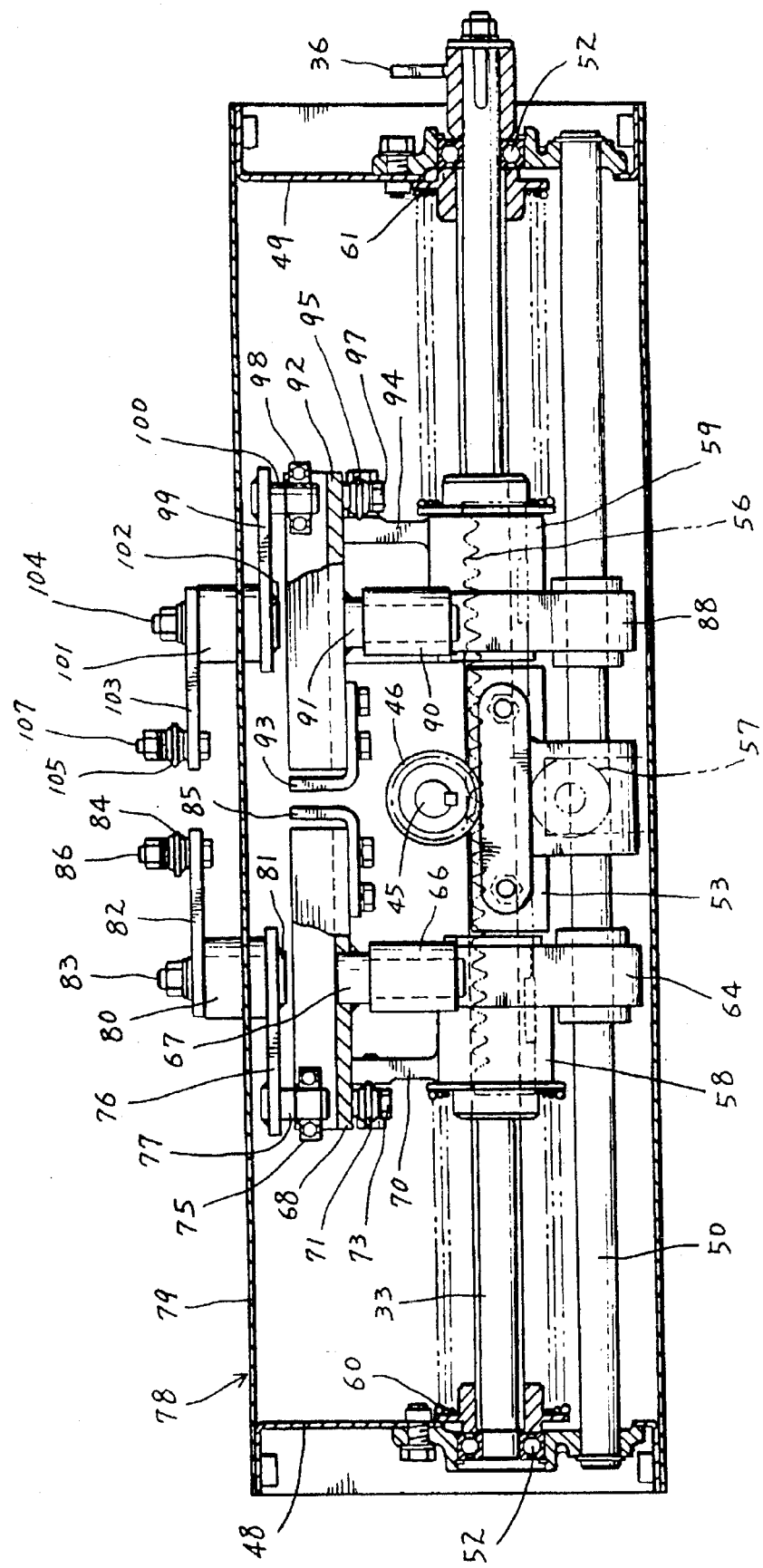
FIG. 5 is a cross-sectional bottom view of the operating section.
Figure 6:
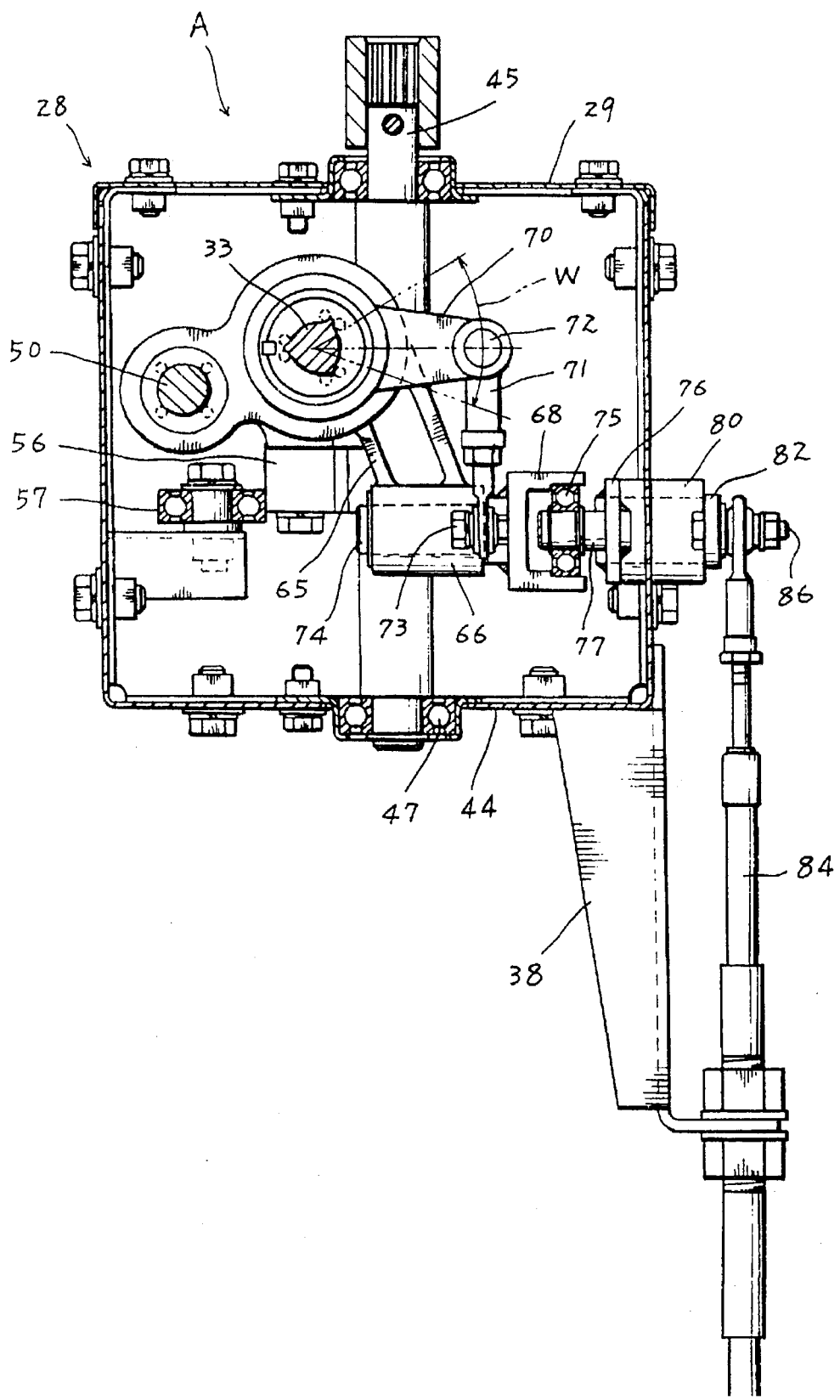
FIG. 6 is a cross-sectional side view of the operating section taken from the left.

As shown in FIGS. 5 and 6, base 45 which receives the steering wheel shaft 31 is rotatably placed between the top plate 29 and bottom plate 44. A pinion gear 46 is provided around the base 45 which is supported by bearing 47. Also, as shown in FIGS. 4 to 6, a sliding shaft 50 spanning left and right side walls 48, 49 of the gearbox 28 is placed parallel to the gear shaft 33 at a certain distance thereto. The shape of the cross section of the gear shaft 33 is generally triangular. Bearings 52 support and let the gear shaft rotate freely.

Figure 7:
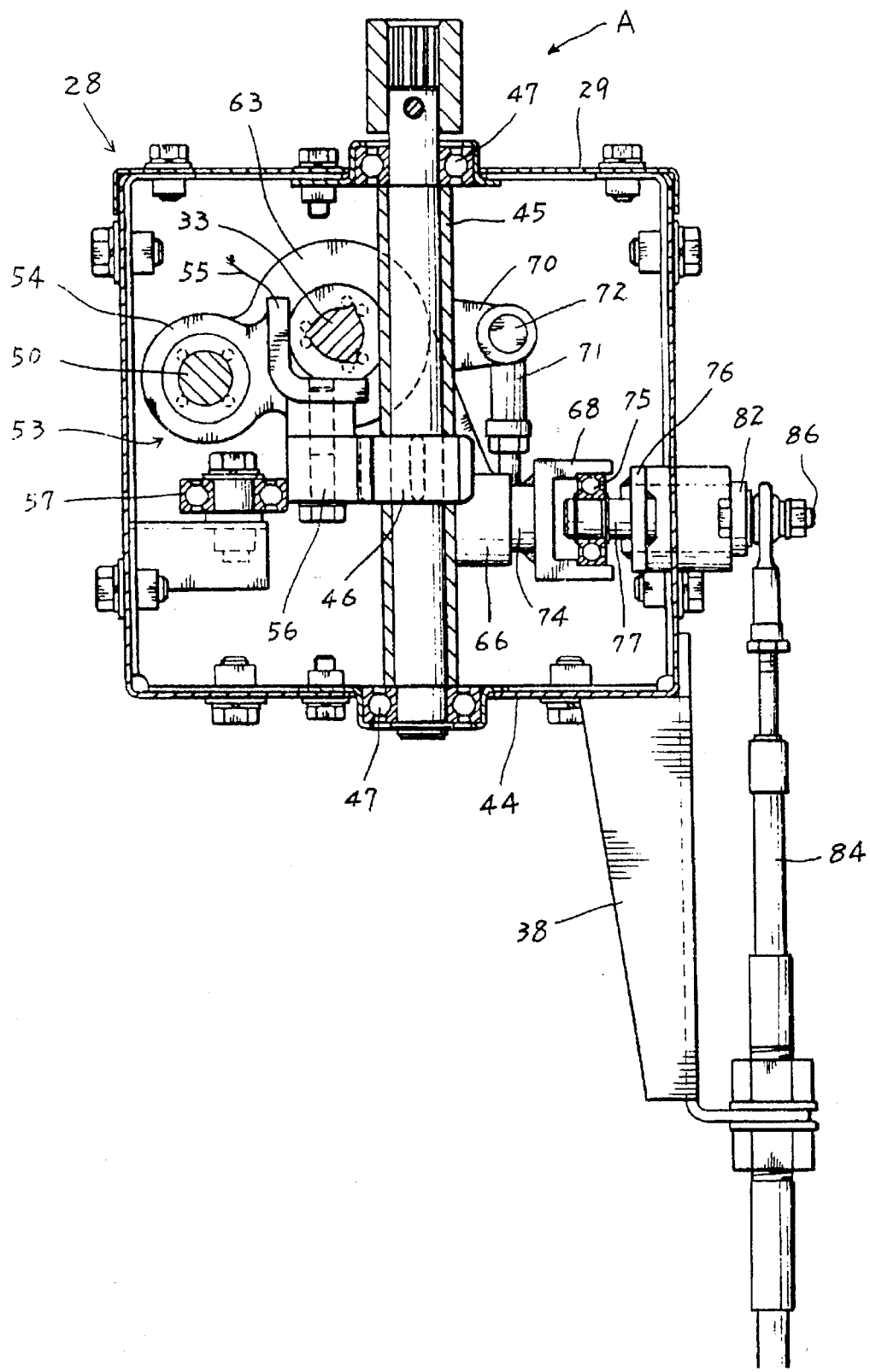
FIG. 7 is another cross-sectional side view of the operating section taken from the left.

As shown in FIGS. 5 to 7, a main slider 53 is mounted on the sliding shaft 50 in such a way as to freely move to the right and to the left. The main slider 53 is composed of base 54 freely slidable on the sliding shaft 50 and actuator 55 positioned just below the gear shaft 33. A rack 56 extending in the axial direction of the gear shaft 33 is provided under the actuator 55 and allowed to engage with the pinion gear 46. In the figure, 57 denotes the rack guide.

By the above mentioned structure, the main slider 53 is moved to the right or the left on the sliding shaft 50 by means of the rack 56 and the pinion gear 46 which is attached to the base 45 of the steering wheel shaft 31, when the steering wheel 32 is turned to the right (clockwise) or to the left (counter-clockwise).

Two sliders 58 and 59 are slidably mounted on the sliding shaft 50 and the main gear shaft 33, one on the right side and another on the left side thereof. Springs 60 and 61 are attached to the outside of the sliders 58, 59 respectively in order to get the sliders 58, 59 back to the original neutral position. On the other hand, an inverted U shaped stopper 62 is provided in the center of the top plate 29 of the gearbox 28 so that the sliders 58, 59 can be stopped at the neutral position by the stopper. Left arm holder 63 is provided on the right end of the left slider 58 so as to freely rotate thereon, as shown in FIGS. 4 to 7. Moreover, a stopper 64 for preventing the left arm holder 63 from rotating counter-clockwise is extended from the front side of the left arm holder 63 so that the stopper 64 can slide on the sliding shaft 50 freely. A left guide supporting arm 65 is extended down and backward from the rear side of the left arm holder 63.

A boss 66 is attached to the end of the arm 65 and a pivot pin 67, the axis of which extends in the longitudinal direction, is horizontally inserted in the boss 66 so as to freely rotate. The rear end of the pivot pin 67 is fixed to the center of the front side of the left guide member 68 which extends in the lateral direction and of which the rear side opens backward. A bushing 69 supports the left arm holder 63.

As shown in FIGS. 4 to 6, a left swinging arm 70 is extended from on the left end of the left slider 58. The upper end of the left link 71, which can be freely extended and contracted, is connected to the end of the left swinging arm 70 by means of connecting pin 72. The lower end of the left link 71 and the front side of the left guide member 68 are connected by means of connecting pin 73.

According to the above mentioned structure, the left guide member 68 is moved with the left slider 58 in one body on the sliding shaft 50 and the main gear shaft 33 in association with the sliding movement of the main slider 53. Also, the left guide member 68 is designed to swing up and down around pivot pin 74 together with the left slider 58 which is rotated in association with the rotating movement of the main gear shaft 33 caused by the gear lever 35. In FIG. 6, W shows the rotation range of the main gear shaft 33 and within the range the end of the left guide 68 swings up and down.

As shown in FIGS. 4 to 7, the left rotator 75 is engaged with the left guide member 68 in such a way as to freely rotate and slide to the right and left along the left guide member. The left rotator 75 and outside end of left rotator supporting arm 76 is joined by means of bearing shaft 77 and the inside end of the arm 76 is joined to the rear wall 79 of the gearbox 28 by means of boss 80 so that the arm 76 can pivot and freely swing up and down with arm bearing shaft 81. Outside the gearbox 28, the end of the arm bearing shaft 81 is joined to the left end of the left tilting plate actuating arm 82 by bolt 83 and the right end of the arm 82 is connected to the right tilting plate 27, which controls hydraulic pressure motor, by means of the left connecting wire 84. In FIG. 5, 85 denotes the stopper for the left rotator 75 and 86 denotes the wire connecting pin.

By this structure, when the left guide member 68 slides to the right or the left keeping its tilting position, the left rotator supporting arm 76 is swung by means of the left rotator 75. At this time, the left tilting plate actuating arm 82 swings up and down oppositely to the swinging movement of the rotator supporting arm 76. This moves the right tilting plate 27 by way of the left connecting wire 84 to control the hydraulic pressure motor.

The above description has been made in relation to a series of members from the left slider 58 to the right tilting plate 27. A similar description can also be made in relation to a series of members from right slider 59 to the left tilting plate 26 because both series of members are made in a symmetrical relationship. However, by way of precaution, the names of the corresponding other members are listed as follows: 87 denotes the right arm holder, 88 the stopper for the right arm holder, 89 the right guide supporting arm, 90 the right boss, 91 the pivot pin, 92 the right guide, 93 the stopper for the right rotator, 94 the right swinging arm, 95 the right link, 97 the connecting pin, 98 the right rotator, 99 the right rotator supporting arm, 100 the bearing shaft, 101 the boss, 102 the arm bearing shaft, 103 the right tilting plate actuating arm, 104 the actuating arm fixing bolt, 105 the right connecting wire, 106 the bushing and 107 the wire connecting pin.

Figure 8:
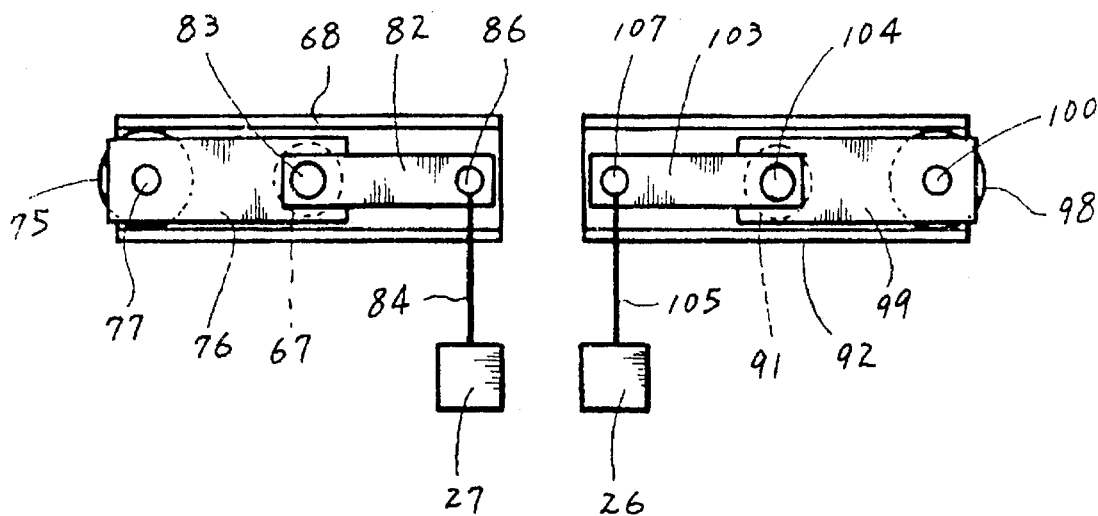
FIG. 8 is an illustration showing gear lever in the neutral position and handle in the neutral position too. (At this time the combine is still.)

Now a sequence of motions caused by the above mentioned members will be described in reference with FIG. 4 and FIGS. 8 to 11. As shown in FIG. 8, the left and right guides 68, 92, the left and right rotator supporting arms 76, 99 and the left and right tilting plate actuating arms 82, 103 generally keep in the horizontal position as long as the gear lever 35 and the steering wheel 32 are put in the neutral position.

Figure 9:
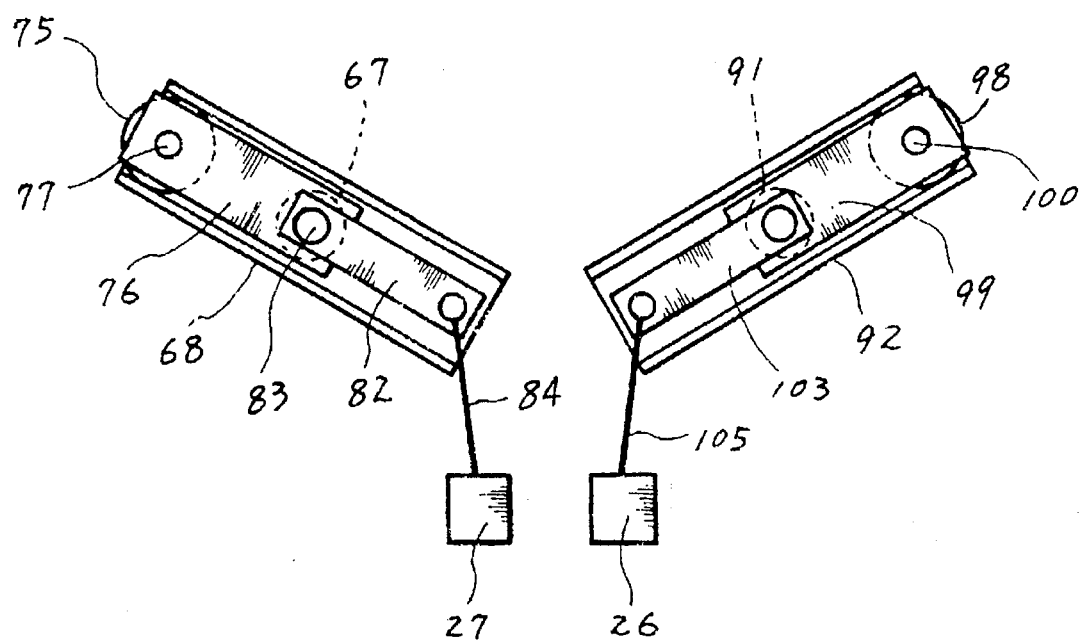
FIG. 9 is an illustration showing the gear lever in the forwarding position and the handle in the neutral position. (At this time the combine goes straight forward.)

Meanwhile, when the gear lever 35 is put in the forwarding position, the main gear shaft 33 begins to rotate by which the left and right sliders are slid, the left and right swinging arms and the left and right links are moved and the left and right guides 68, 92 are turned around the pivot pins 67, 91. And thereby the left and right rotator supporting arms 76, 99, the arm bearing shafts 81, 102 and the left and right tilting plate actuating arms 82, 103 are put in the tilting position as shown in FIG. 9.

In this case, the tilting angle of the left tilting plate 26 is equal to that of the right tilting plate 27 and so the left and right crawlers 2, turn forward at the same speed; thus, the combine goes straight forward.

However, when the handle is turned clockwise, the steering wheel shaft 31 is rotated accordingly and the rack 56 coupled with the pinion 46 is moved to the left, by which the main slider 53 pushes and makes the left slider 58 slide to the left.

Figure 10:
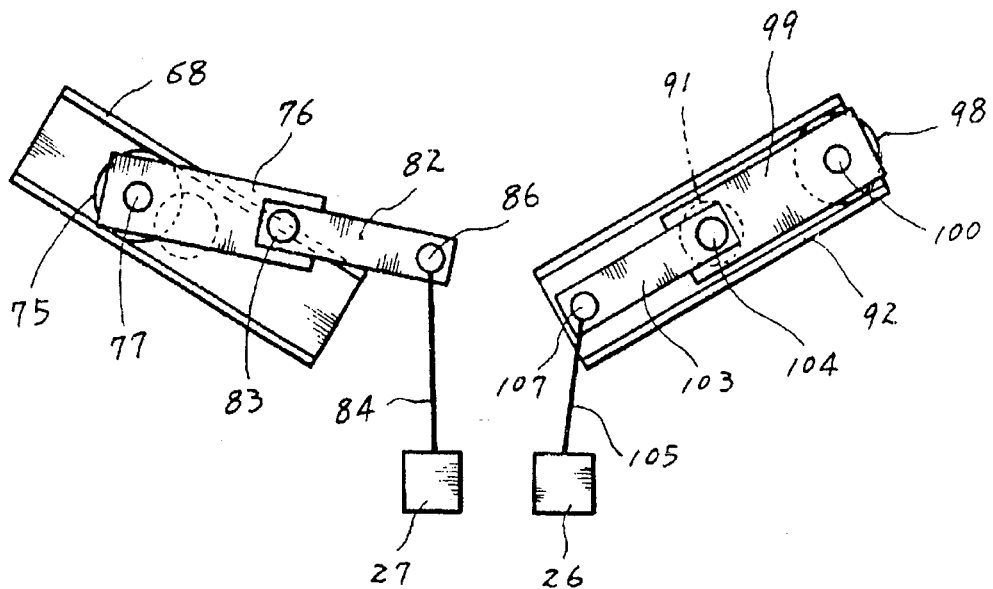
FIG. 10 is an illustration showing the gear lever in the forwarding position and the handle turned clockwise. (At this time the combine turns to the right.)

As a result, the left guide 68 coupled with the left slider 58 is slid to the left with its tilting position unchanged and the left rotator 75 is slid generally to the center of the left guide as shown in FIG. 10, by which the left rotator supporting arm 76 and the right tilting plate actuating arm 82 take approximately horizontal positions and the right tilting plate 27 takes an approximately neutral position.

In this case, the speed of the right crawler 2 is decreased or even reduced to zero, while the left crawler 2 keeps advancing as it is. As a result, the combine turns to the right gently.

Figure 11:
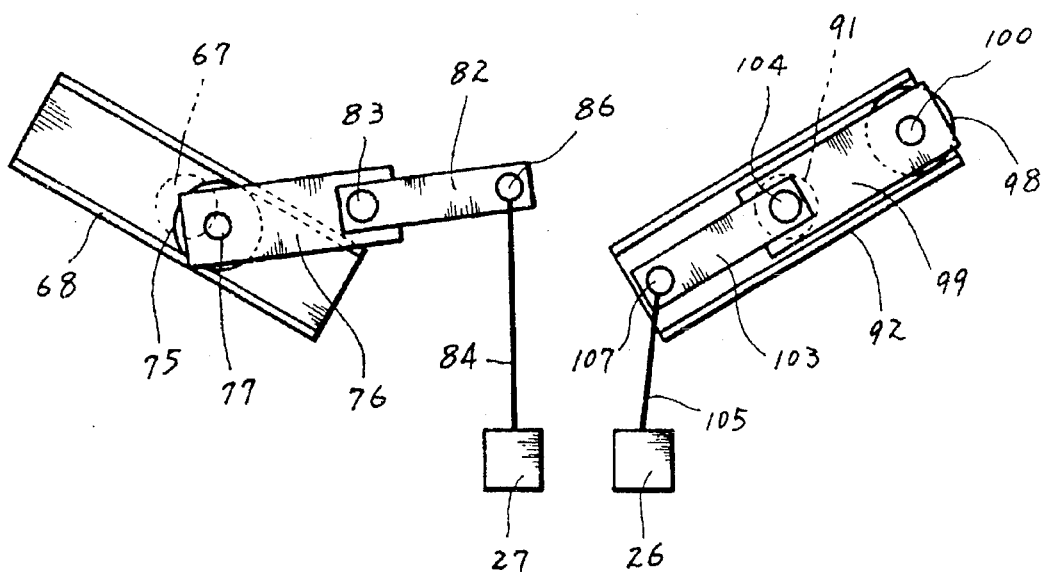
FIG. 11 is an illustration showing the gear lever in the forwarding position and the handle turned more clockwise. (At this time the combine spins or sharply turns to the right.)
Figure 12:
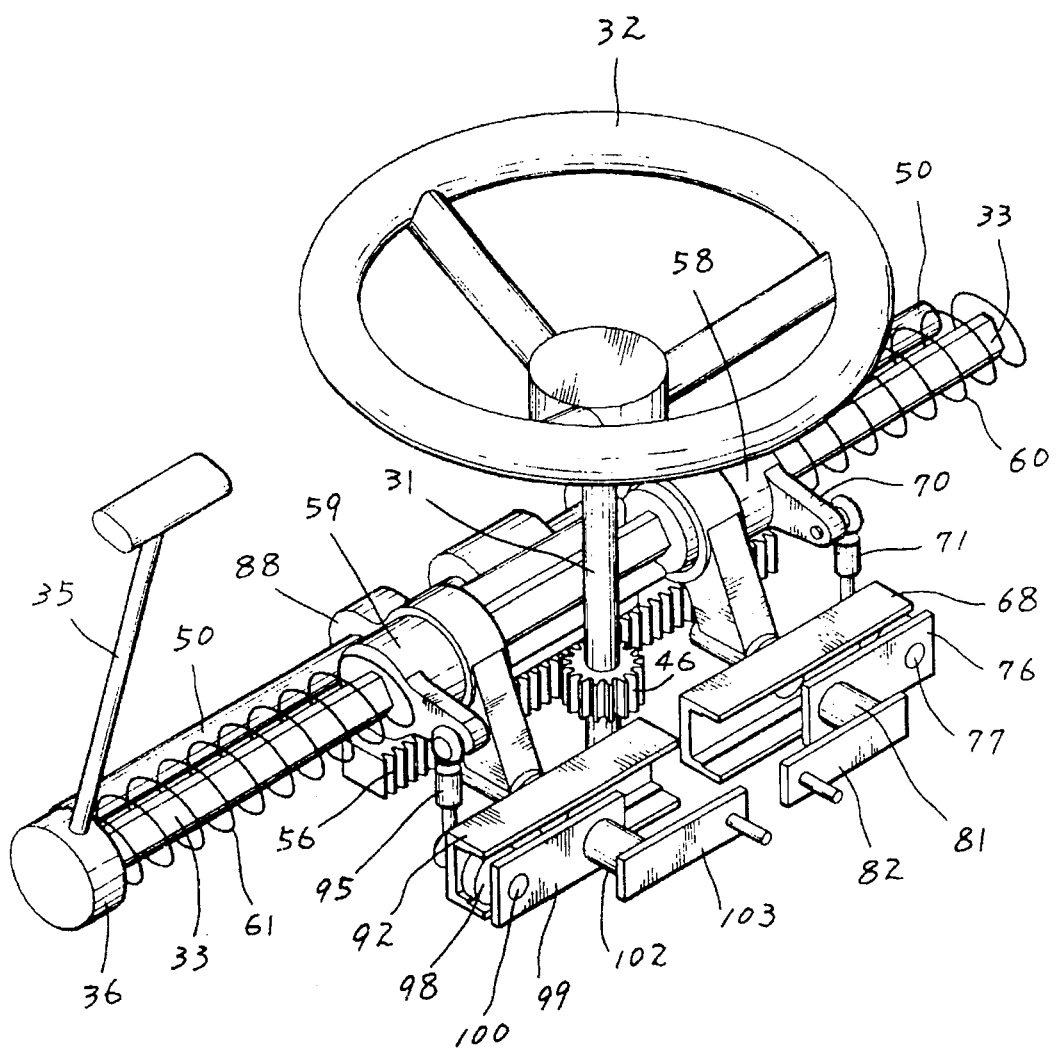
FIG. 12 is a perspective view of the operating section.
Figure 13:
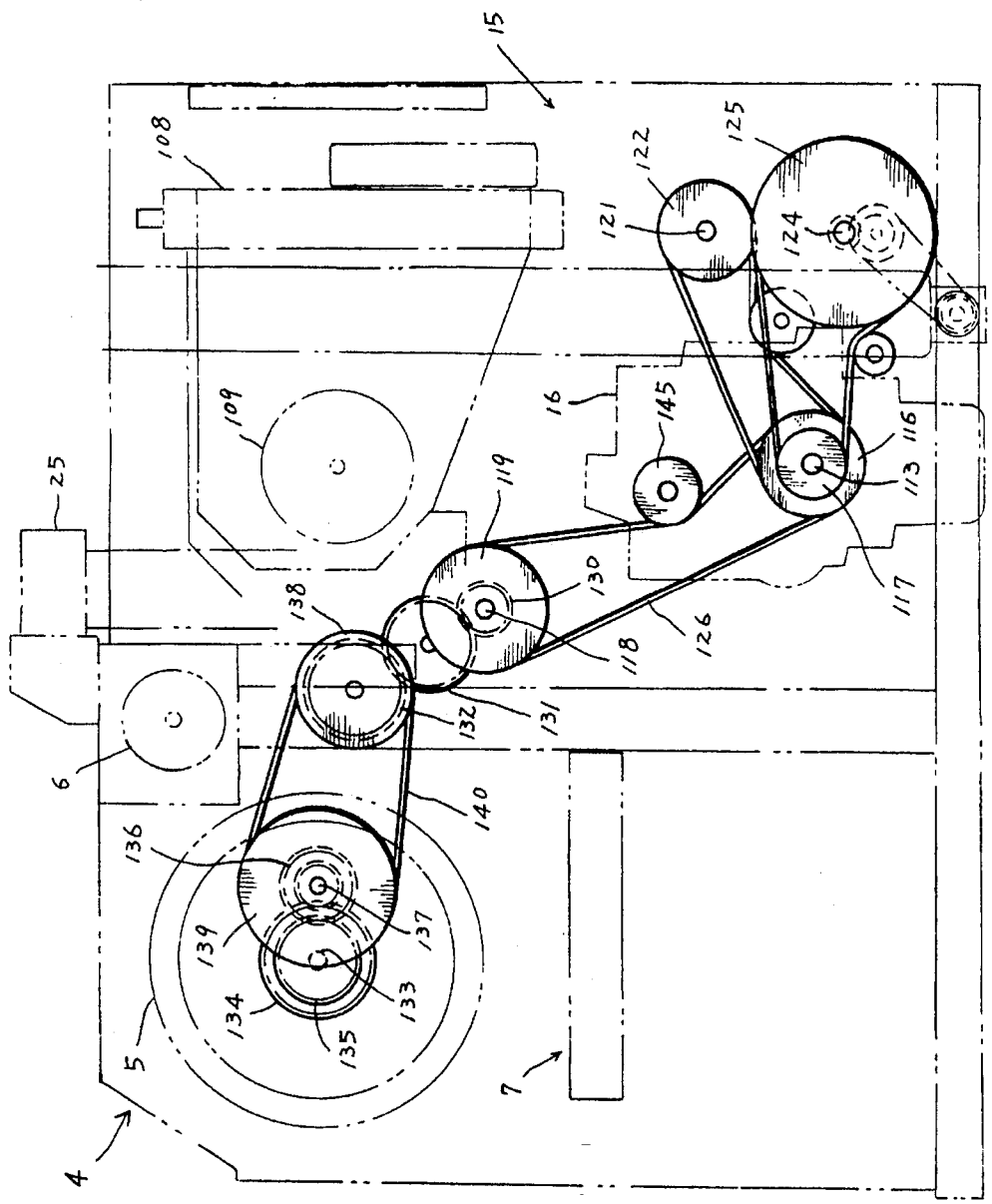
FIG. 13 is a rear view of driving system for hulling machine.
Figure 14:
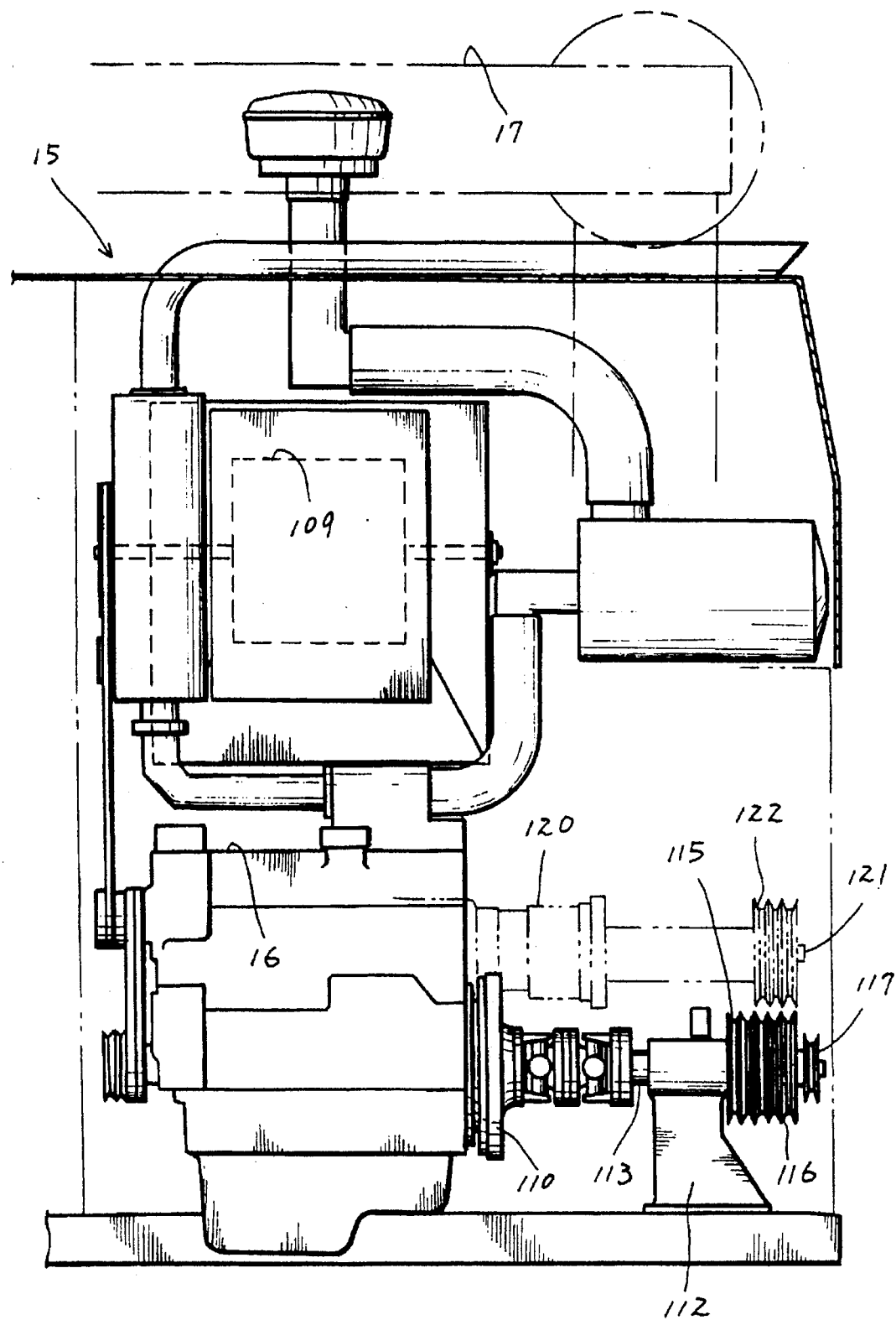
FIG. 14 is a cross-sectional view of engine section.
Figure 15:
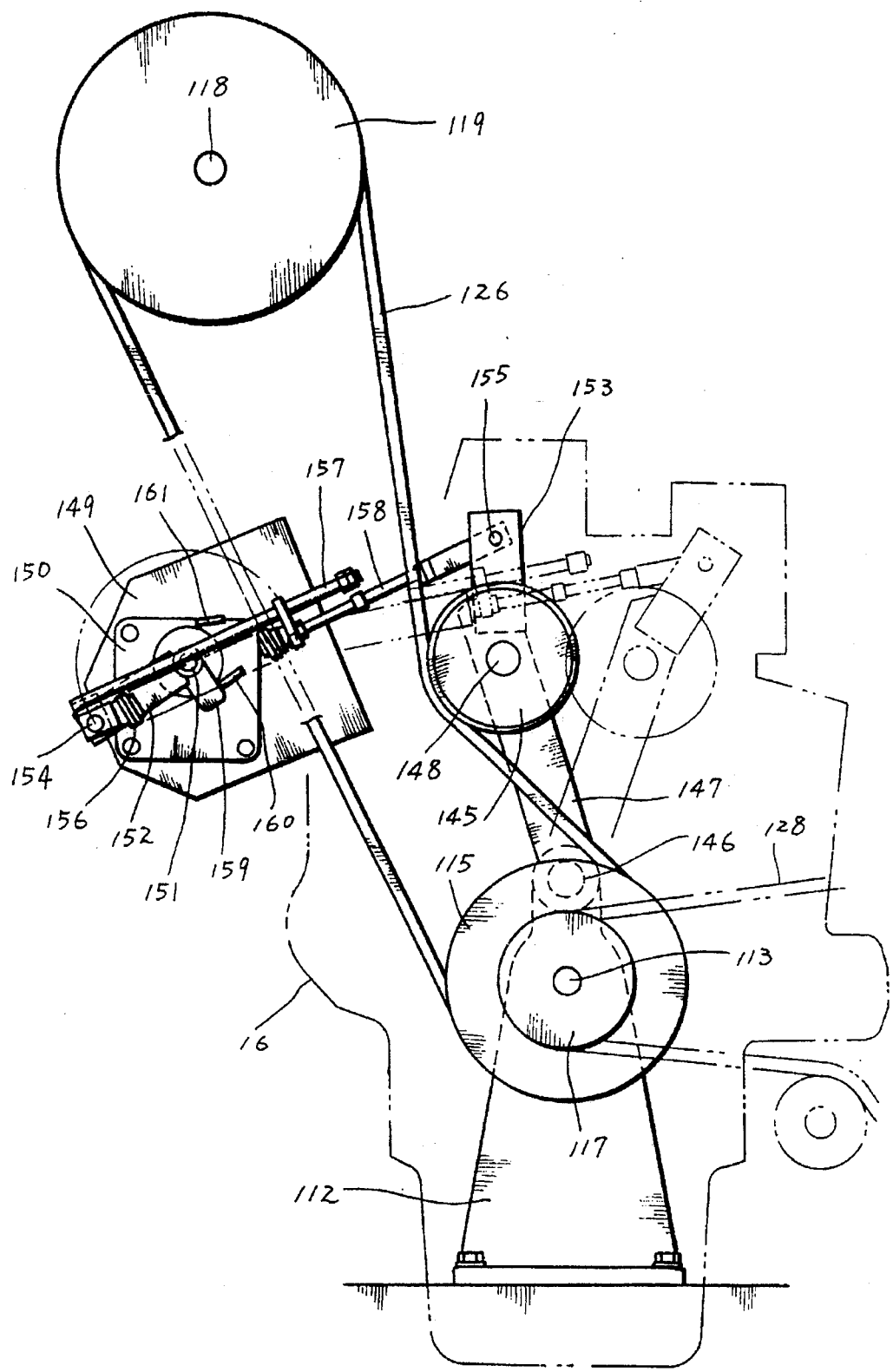
FIG. 15 is a rear view of clutch section.
Figure 16:
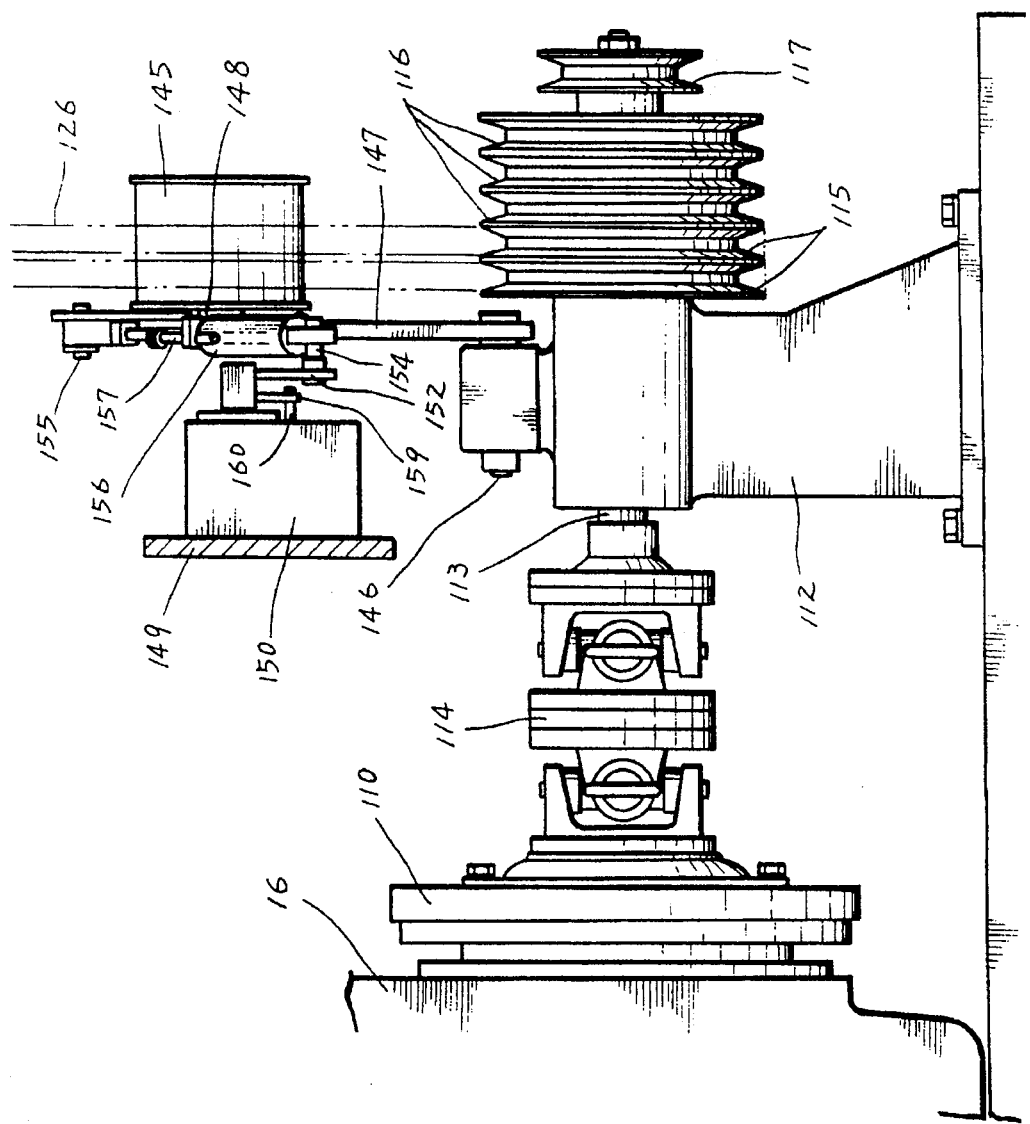
FIG. 16 is a side view of the clutch section.
Figure 17:
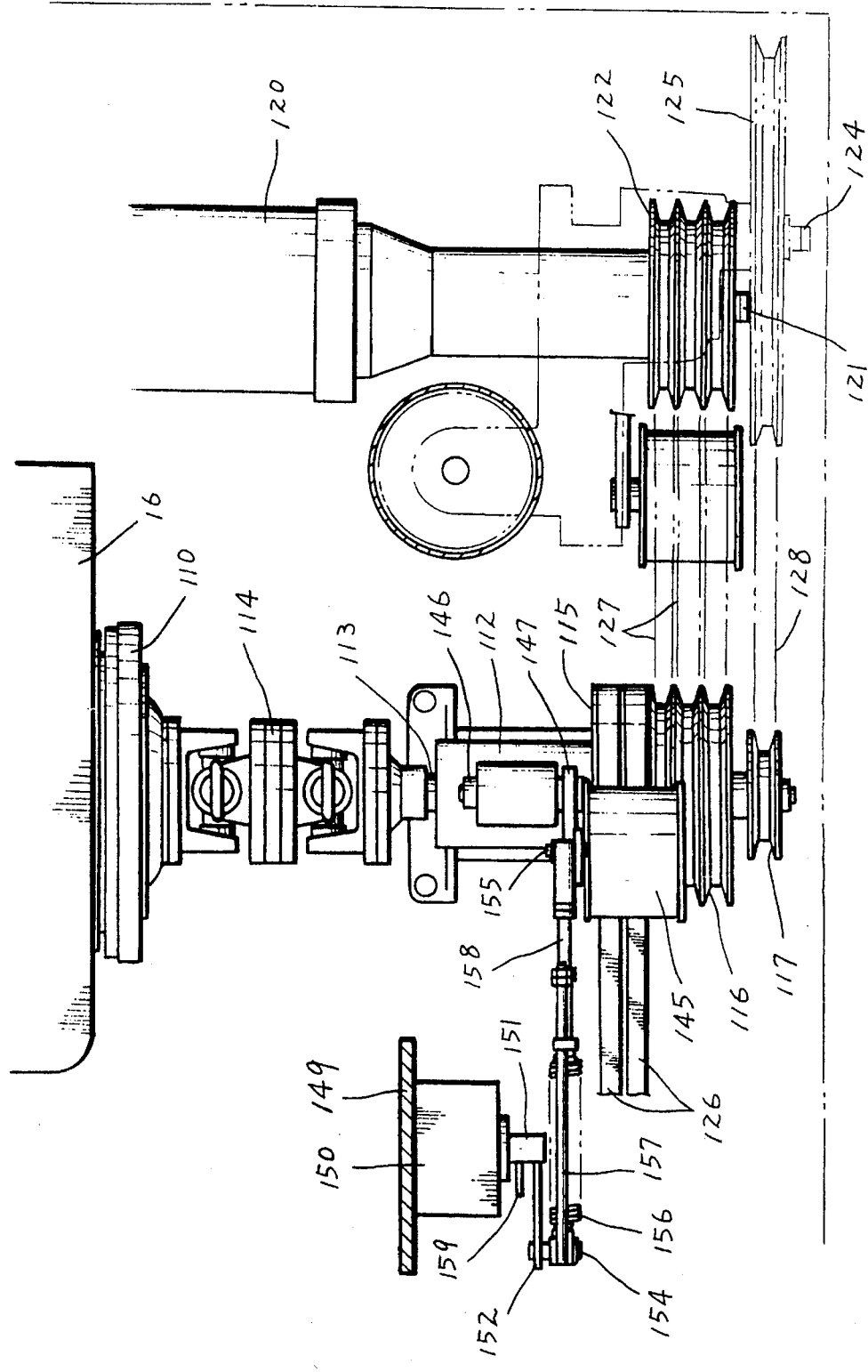
FIG. 17 is a plan of the clutch section.
Figure 18:
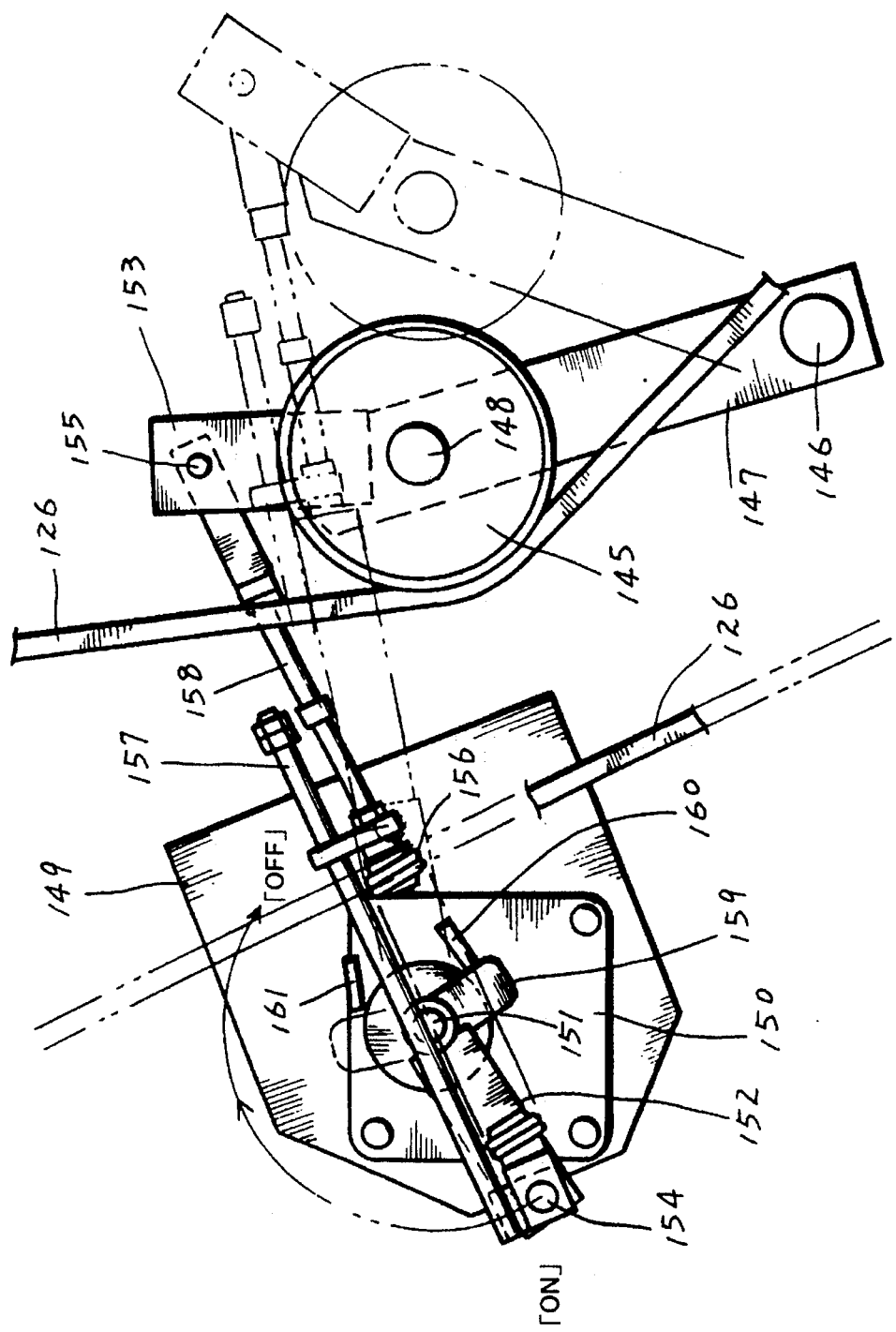
FIG. 18 is a partially enlarged rear view of the clutch section.
Figure 9:
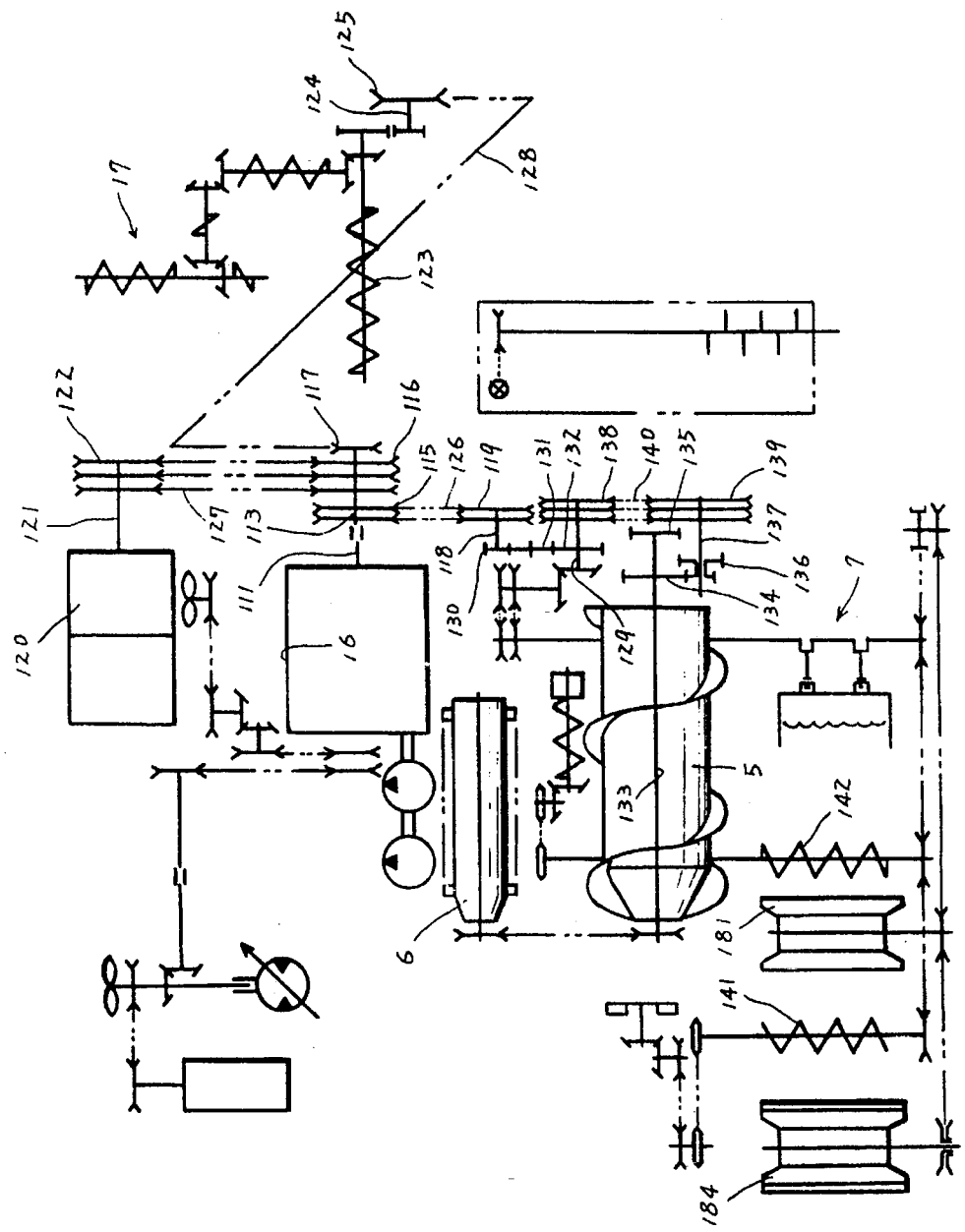

When the steering wheel 32 is turned more clockwise, the left guide 68 is slid more to the left with its tilting position unchanged and the left rotator 75 having been generally in the middle of the left guide 68 is moved to the right end of the left guide as shown in FIG. 11, by which the left ends of the left rotator supporting arm 76 and the right tilting plate actuating arm 82 are lowered and the right ends are raised. As a result, the right tilting plate 27 is tilted so as to cause the associated crawler to go backward.

In this case, the right crawler 2 turns back, while the left crawler 2 turns fore. Thus, the combine can spin or turn clockwise sharply.

The combine can be spun or turned counter clockwise by turning the steering wheel 32 in the direction opposite the above. Also, regardless of the steering wheel position, the combine can be stopped by getting the gear lever 35 back to the neutral position or moved backward by putting the gear lever in the retreating position or turned to the right or the left while being moved backward by using both the steering wheel and the gear lever. By such excellent maneuverability of the combine many kinds of cropping jobs can be carried out in an efficient manner.

That is, because the combine can be turned freely regardless of the gear lever position or stopped regardless of the steering wheel position, not only is maneuverability easy but misoperation can be avoided and safety of workers in jobs is assured, by which cropping jobs can be made efficiently.

In this example, the sliders 58, 59 are arranged in the left and right of the gearbox 28; however, as a matter of course they can be arranged above and below or obliquely to each other according to the circumstances.

As shown in FIGS. 13 to 19, engine 16 for driving the hulling machine 4, radiator 108 for cooling the engine and sirocco fan 109 for cooling the radiator 108 are arranged separately above and below in the hulling section. Output shaft 111 on the flywheel 110 side of the engine 16 is connected to counter shaft 113 supported by shaft bearing 112 on the right side of the engine 16 by a universal joint 114. Pulleys 115, 116, 117, each fixed to the counter shaft 113, are respectively connected to input pulley 119 of the hulling machine's shaft 118, input pulley 122 of HST's shaft 121 and input pulley 125 of input shaft 124 for driving the auger 123 by using transmission belts 126, 127 and 128 in order to drive the hulling machine 4, the crawlers 2 and the grain tank 8.

The hulling machine shaft 118 and the hulling machine counter shaft 129 are connected to each other by using reduction gears 130, 131 and 132. The hulling machine counter shaft 129 is connected to gearbox shaft 137 by using pulleys 138, 139 and belt 140. The gearbox shaft 137 is connected to the cylinder shaft 133 with two stage speed change gears 134, 135 and switching gear 136, by which the cylinder 5 can be rotated in two, high/low, different speeds. Meanwhile, 141 and 142 denote first and second conveyers of the hulling machine 4, 184 denotes the grain fan and 181 denotes a prefan or an auxiliary fan of the grain fan 184.

Additionally, the tension on the transmission belt 126 connecting the counter shaft 113 and the hulling machine shaft 118 is controlled by the tension roller clutch 145. The tension roller 145, which can be mounted on or dismounted from the belt 126, is held by roller bearing shaft 148 on one upper end of tension arm 147 of which the other lower end is pivotally fixed to bearing shaft 146 on the top of the bearing shaft base 112. On the other side of the belt 126 on which tension is applied by the tension roller clutch 145, there is an electric clutch motor 150 pivotally mounted on plate 149. Shaft 154 on the top of rotating arm 152 fixed to motor shaft 151 and shaft 155 on the top of plate 153 unmovably fixed to the top of the tension roller clutch 145 are connected to each other to jointly move by using tension spring 156 and connecting rod 158 provided with guide rod 157. By this device, the tension roller clutch can be mounted on or dismounted from the belt 126 by turning the motor in right or reverse direction.

The connecting rod 158 which is laid in line with the tension spring 156 between the two shafts 154 and 155 is provided so that it comes to be generally in line with the rotating arm 152 when the tension roller clutch 145 is put on. In this device in order to prolong the belt's life, speed of the tension roller clutch from its touching the belt to its showing the maximum tension is designed to gradually slow down and action in response to on/off of the clutch is also designed to take place after a certain time interval.

The motor shaft 151 is provided with a butting piece 159 so that the piece is butted against stoppers 160, 161 mounted on the clutch motor 150 when the tension roller clutch is switched on or off, whereby the motor's position is limited. More specifically, the piece 159 is butted against the stopper 160 so that the spring 156 and the connecting rod 158 can maintain their position over the fulcrum of the motor shaft 151 when the tension roller clutch is switched on. Also the piece 159 is butted against the stopper 160 so that they can maintain their position when one side of the belt 126 to which the tension roller clutch 145 is touched is so tensed as to get the tension arm 147 back to the off-position and the other side of the belt 126 is slackened by the engine stop (this gives the cylinder 5 inertia rotation), for example, while the tension roller clutch is being switched on, whereby their position is prevented from turning over the limited range.

As described above, compared to the conventional means in which the tension roller clutch and clutch lever are connected with and operated by wire, this new system, in which the on/off switching of the tension roller clutch is conducted by the clutch motor 150, can simplify the structure of the operation section, widely reduce manipulating power and make the tension roller clutch conduct exact on/off switching.

Also in this case, abrupt on/off switching of the tension roller clutch 145 is avoided by putting a certain time interval before that switching by using the motor. That is, when the roller clutch is switched on, action before the belt is tensed by the tension roller clutch can be made to gradually slow down by the semi-circle movement of the rotating arm 152. In this way, the sudden clutch impact on the belt 126 is avoided and the belt is prevented from breaking, whereby the life of the belt can be prolonged.

Figure 20:
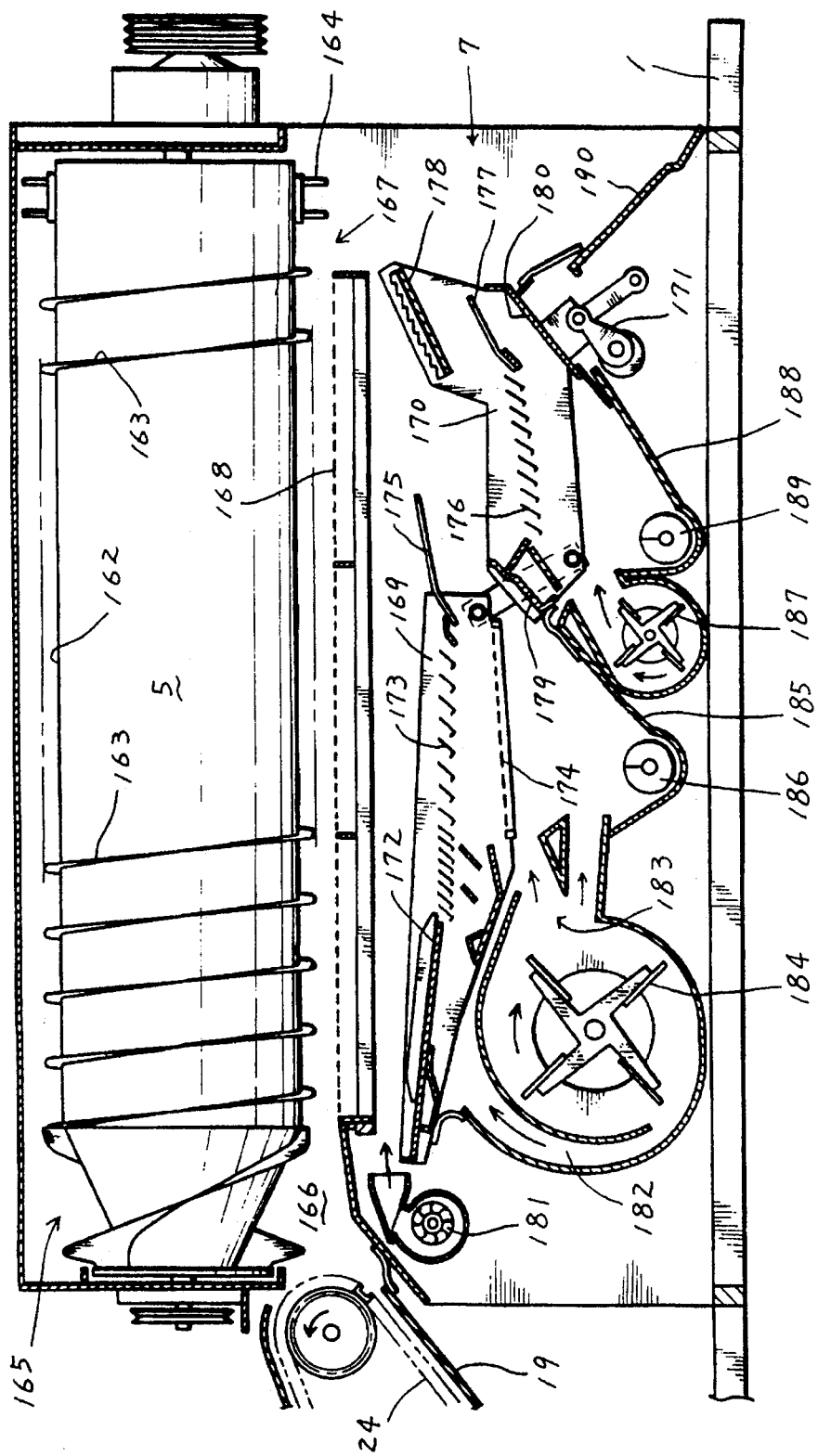
FIG. 20 is a side view of the hulling section.
Figure 21:
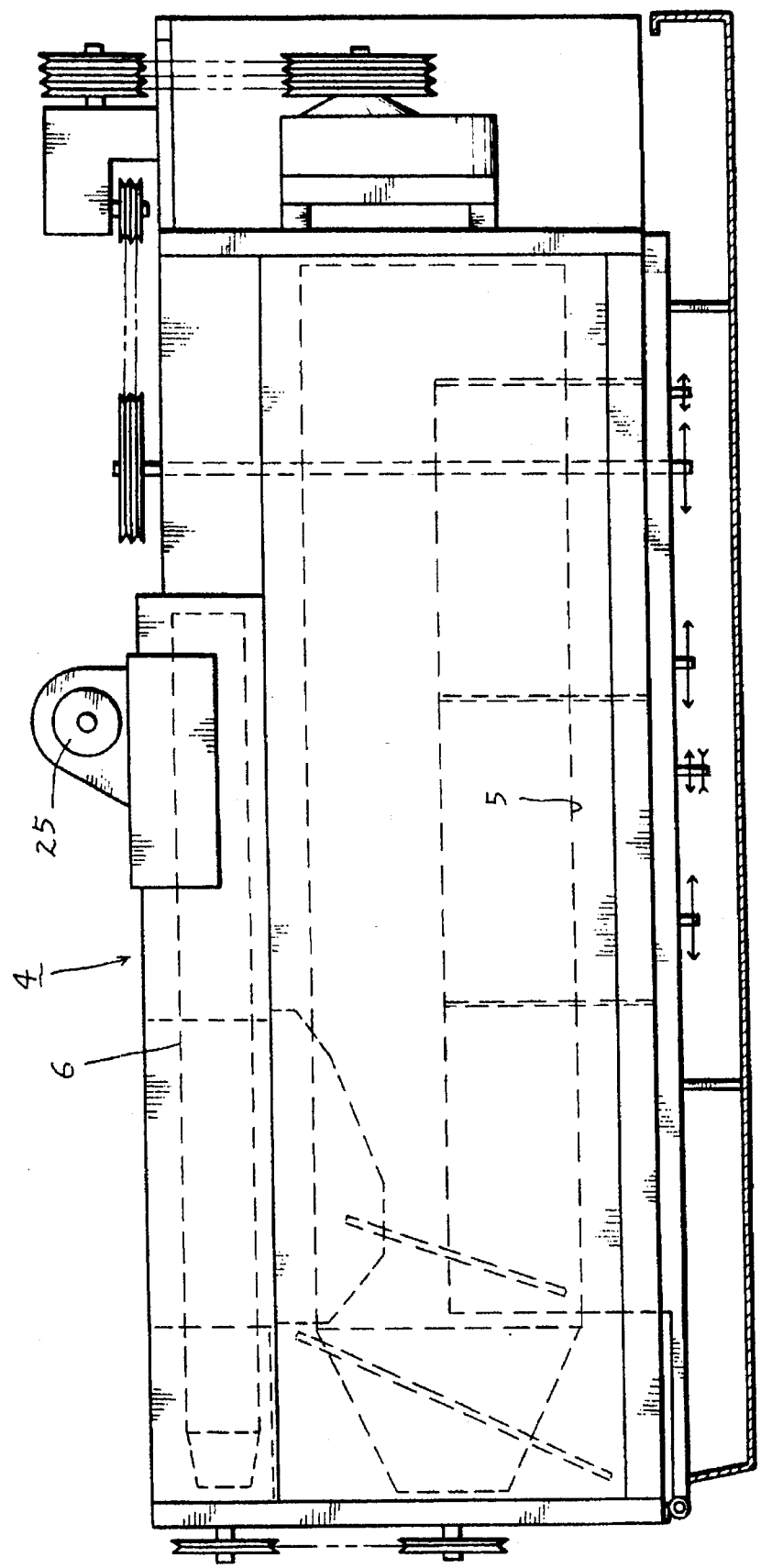
FIG. 21 is a plan of the hulling section.
Figure 22:
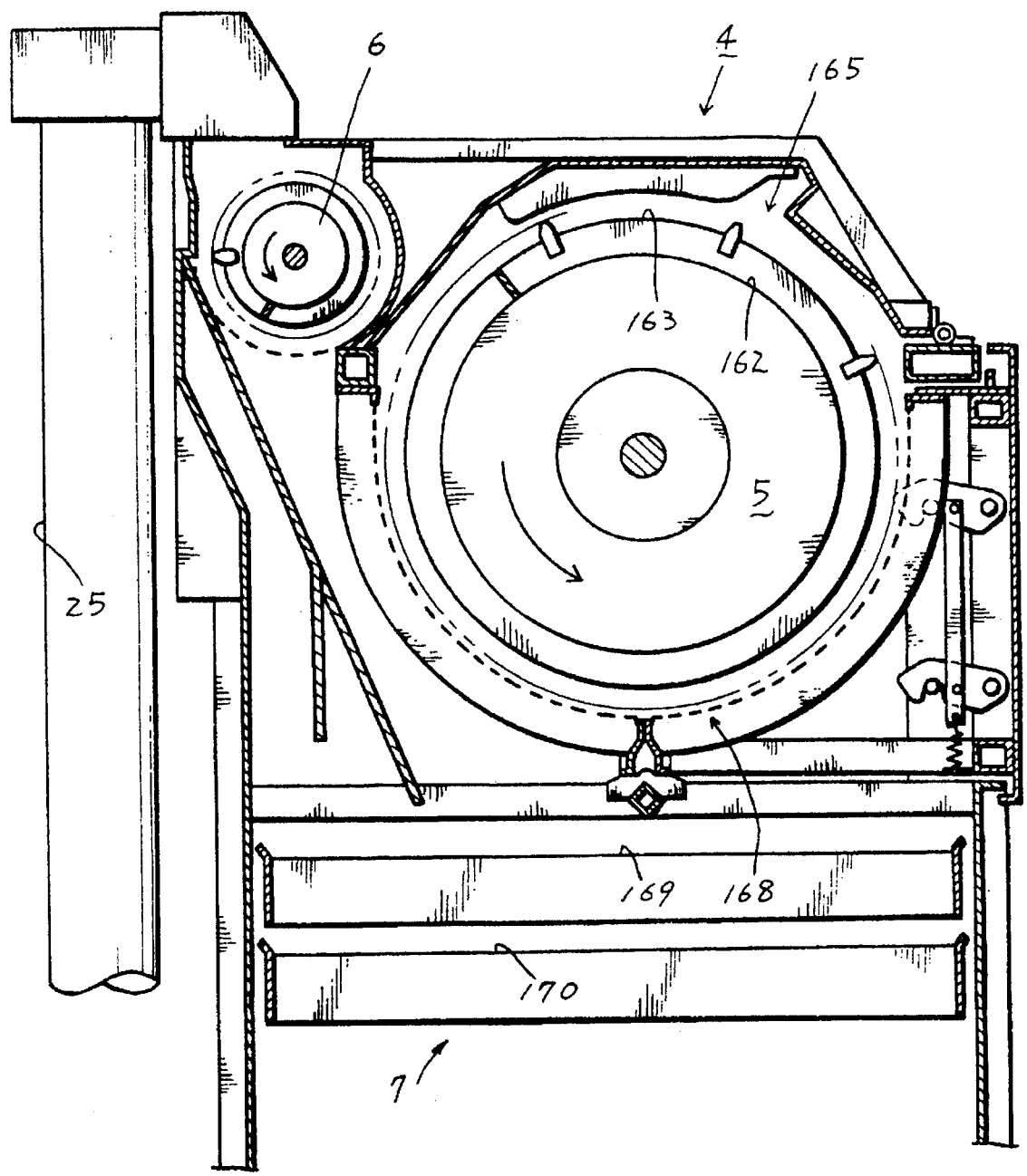
FIG. 22 is an elevation of the hulling section.

As shown in FIGS. 20, 21 and 22, the screw-type cylinder 5 is comprised of cylindrical body 162, the length of which is generally equal to the length of the hulling machine 4. A spirally winding vane 163 on the outside of the cylindrical body and projection 164 for exhausting dust is provided at the rear end of the cylindrical body 162. The screw type cylinder 5 is supported by bearings with its axis laid in the longitudinal direction; its front end is an inlet communicating with the feeder house 19 and its rear end is near outlet 167 for purging dust. Provided to under the cylinder is receiving net 168 where the reaped plants taken in from the feeder house can be hulled.

The grain sorter is provided with swinging grain sorting plates 169, 170 to which swinging link 171 gives swinging movement in the longitudinal direction. Provided in the front grain sorting plate 169 is a feed pan 172 under the front part of the cylinder 5, first chaff sieve 173 to regulate the amount of falling grains, first screening net 174 under the first chaff sieve 173 and sieve line 175 connected to the rear part of the first chaff sieve 173. Provided to the rear grain sorting plate 170 is a second chaff sieve 176 under the rear part of the sieving line 175, sieve line 177 connected to the rear part of the second chaff sieve 176, returning plate 178 above the sieve line 177 and below the rear end of the receiving net 168 and first and second grain flowing plates 179, 180. The front end of the returning plate 178 is located above the front end of the sieve line and the rear end thereof is located under the rear end of the receiving net 168.

In addition to the above mentioned members: There is a fan 181 for removing dust which sends sorting air onto the feed pan 172. A grain fan 184 which sends sorting air through the first and second air ducts 182, 183 and under the first chaff sieve 173 and first sorting net 174. A first trough 185 and first conveyer 186 which receives grains from the first sorting net 174 and feeds them to the grain lifting pipe 9. A second sorting fan 187 which sends sorting air under the second chaff sieve 176 and onto the second grain flowing plate 180. A second trough 188 and second conveyer 189 which receive grains from the second flowing plate 180 and sends them to the second returning pipe 25. A third outlet 190 which is in communication with the sieve line 177 on the rear end of the rear grain sorting plate 170 in this system, where grains on the first trough 185 are sent to the grain tank 8 and returned grains on the second trough 188 are sent to the treating drum 6.

Figure 23:
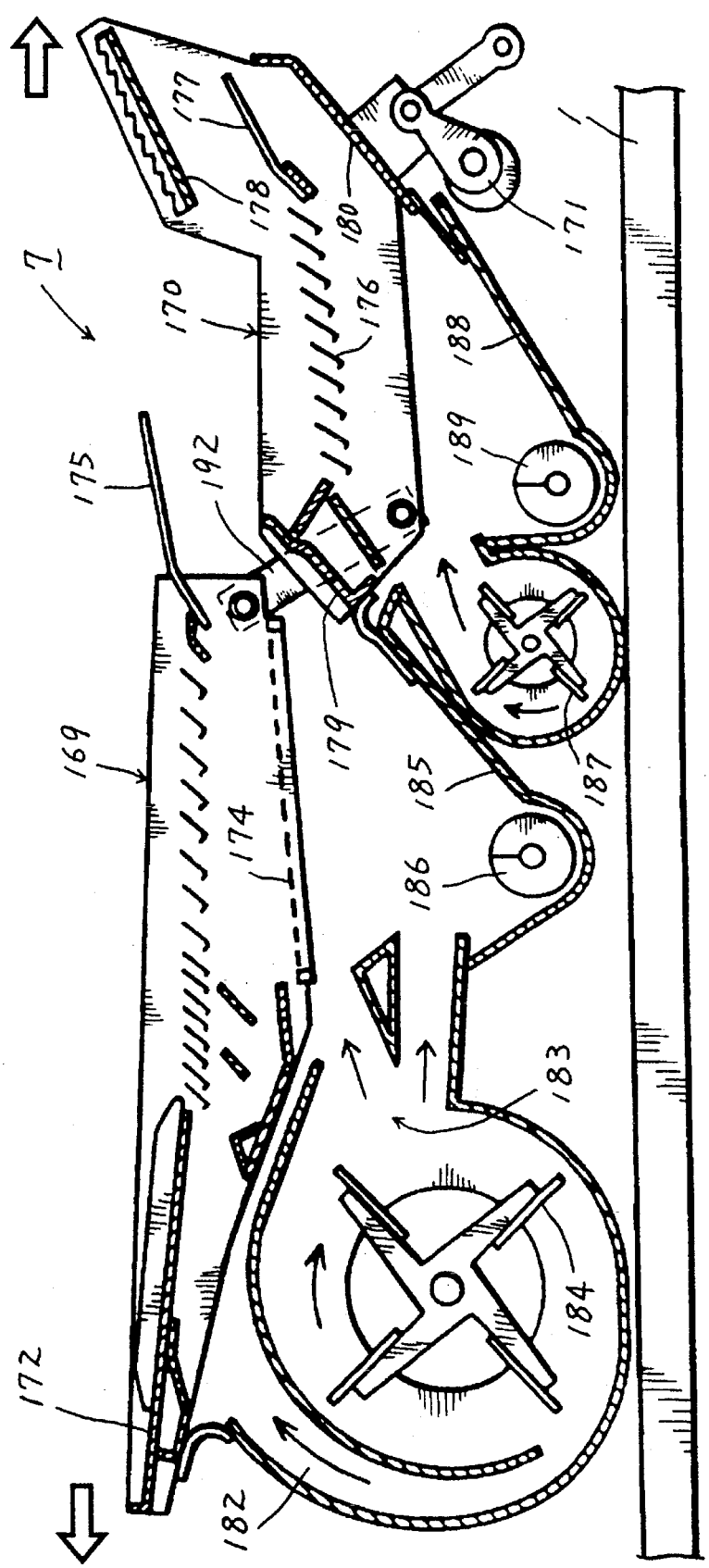
FIG. 23 is a side view of grain sorting machine.
Figure 24:
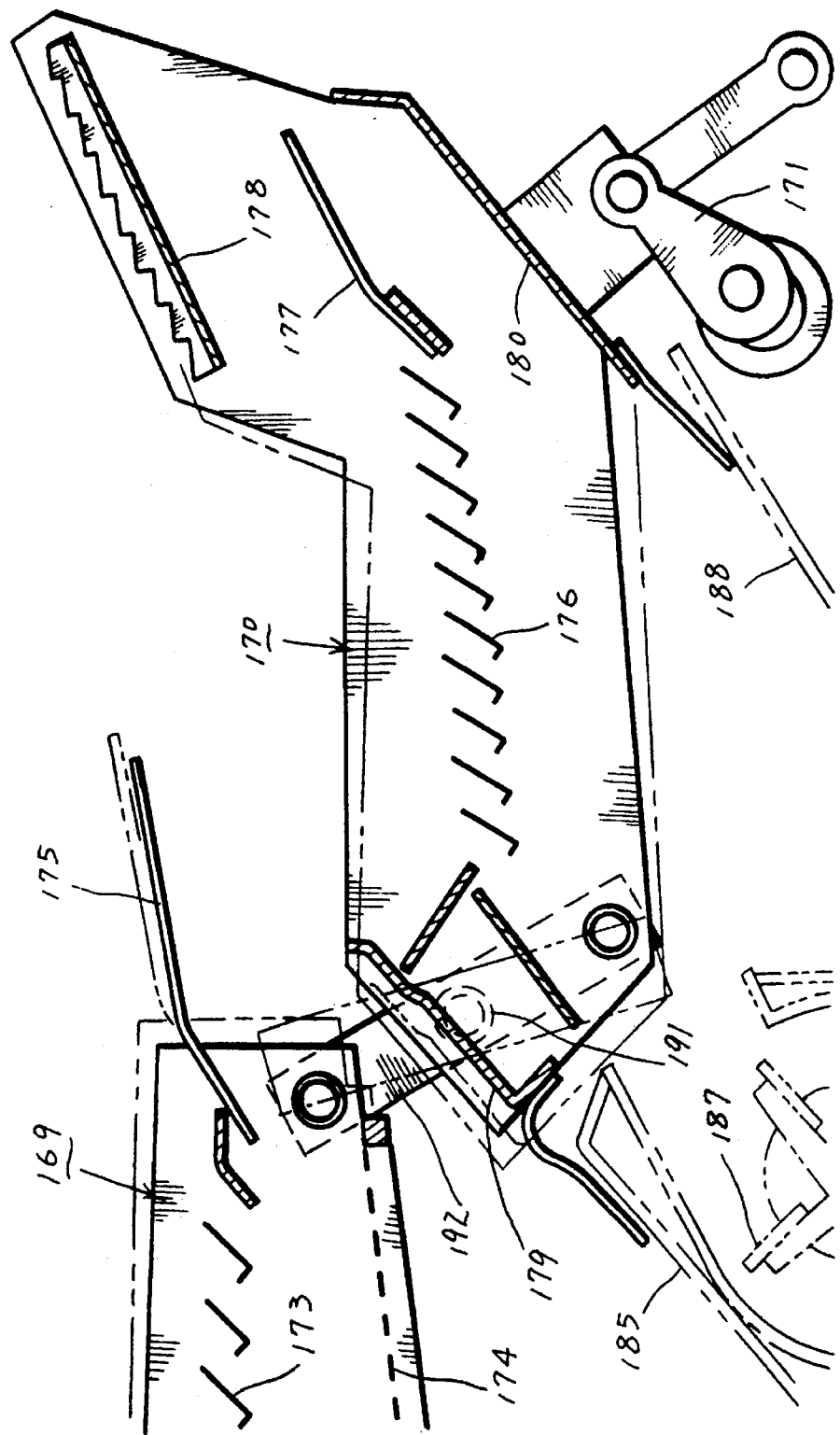
FIG. 24 is an enlarged side view of swinging grain sorting plates.

As shown in FIGS. 20, 23 and 24, fixed before the rear grain sorting plate 170 is a first grain flowing plate 179. The difference in weight between the front and the rear grain sorting plates 169, 170 is made as little as possible. The first grain flowing plate 179 is always located behind and under the rear end of the first sorting net 174. The rear end of the front grain sorting plate 169 and the front end of the rear grain sorting plate 170 are respectively joined to each end of arm 192, the center of which is held by and can freely swing around pivot 191, whereby when one grain sorting plate goes forward, another goes backward reciprocally. By this device, grains are always sent from the first sorting net 174 through the first flowing plate 179 to the first trough 185 even when the two grain sorting plates are drawn the nearest to or the farthest from each other or even when the amount of grains falling from the first sorting net 174 comes to be great. Also because the first sorting net 174 and the first grain flowing plate 179 are reciprocally moved, grains are prevented from staying on the plate 179 and this makes it possible to screen grains from dust in wet condition and eventually leads to the improvement in working efficiency.

Having now particularly described and ascertained the nature of this invention and in what manner the same is to be performed, we declare what we claim is:

1. A working vehicle propelled by left and right crawler assemblies, including a combined directional and speed control means comprising:

a shaft supported in a housing mounted in said working vehicle;

a lever for rotating said shaft;

a left and a right slider, each designed to slide on said shaft along said shaft's axial line;

a left and a right speed and direction changing means linked respectively to said left and right sliders for controlling the speed and direction of said crawler assemblies, characterized in that said shaft and said left and right sliders are moved as one body by said lever whereby said left and right speed and direction changing means are moved at the same time;

a main slider on said shaft within said housing;

a rotatable steering control member;

means for moving said main slider in response to rotation of said steering control for moving said left and right sliders so they affect said left and right speed and direction changing means differently in response to rotation of said shaft for controlling the relative speed and direction of said left and right crawler assemblies independently for turning said working vehicle.

2. A working vehicle as claimed in claim 1, wherein said working vehicle is an agricultural combine including a hulling machine comprising a screw conveyer cylinder and a grain sorter mounted on a floor of said vehicle.

3. A working vehicle as claimed in claim 1, wherein said rotatable steering control member includes a steering wheel substantially formed in a circular shape.

4. A working vehicle as claimed in claim 1, wherein said left and right crawler assemblies are driven by hydraulic means.

5. A working vehicle as claimed in claim 1, wherein the change in motion of said working vehicle resulting from said lever operation is along a straight line when said left and right sliders are not affected by said main slider.

6. A working vehicle as claimed in claim 4, wherein the speeds of said left and right crawler assemblies are changed by said rotatable steering control member and said lever.

* * * * *